(12) United States Patent
Thrasher et al.

(10) Patent No.: US 7,685,269 B1
(45) Date of Patent: Mar. 23, 2010

(54) SERVICE-LEVEL MONITORING FOR STORAGE APPLICATIONS

(75) Inventors: Russell Thrasher, Raleigh, NC (US);
Abhijit Muthiyan, Cary, NC (US);
Mark Sutter, Chapel Hill, NC (US);
Huseyin Kaya, Oviedo, FL (US)

(73) Assignee: Symantec Operating Corporation, Mountain View, CA (US)

( * ) Notice: Subject to any disclaimer, the term of this patent is extended or adjusted under 35 U.S.C. 154(b) by 1724 days.

(21) Appl. No.: 10/327,462

(22) Filed: Dec. 20, 2002

(51) Int. Cl.
*G06F 15/173* (2006.01)
(52) U.S. Cl. ................................................ 709/224
(58) Field of Classification Search ......... 709/227–229, 709/201–203, 208–211, 223–226; 718/100–108
See application file for complete search history.

(56) References Cited

U.S. PATENT DOCUMENTS

| | | | | |
|---|---|---|---|---|
| 5,966,730 A * | 10/1999 | Zulch | | 711/162 |
| 6,567,935 B1 | 5/2003 | Figueroa | | |
| 6,845,387 B1 * | 1/2005 | Prestas et al. | | 709/203 |
| 7,010,493 B2 * | 3/2006 | Yamamoto et al. | | 709/219 |
| 7,103,628 B2 * | 9/2006 | Neiman et al. | | 709/201 |
| 7,225,250 B1 * | 5/2007 | Harrop | | 709/224 |
| 7,275,103 B1 * | 9/2007 | Thrasher et al. | | 709/224 |
| 2002/0188697 A1 * | 12/2002 | O'Connor | | 709/219 |
| 2003/0126202 A1 * | 7/2003 | Watt | | 709/203 |
| 2003/0237017 A1 * | 12/2003 | Jibbe | | 714/4 |
| 2004/0030806 A1 * | 2/2004 | Pandya | | 709/250 |
| 2004/0205089 A1 * | 10/2004 | Alon et al. | | 707/200 |
| 2005/0256961 A1 * | 11/2005 | Alon et al. | | 709/229 |
| 2007/0038759 A1 * | 2/2007 | Hanson et al. | | 709/227 |

* cited by examiner

*Primary Examiner*—Shawki S Ismail
*Assistant Examiner*—Christopher Biagini
(74) *Attorney, Agent, or Firm*—Robert C Kowert; Meyertons, Hood, Kivlin, Kowert & Goetzel, P.C.

(57) ABSTRACT

Embodiments of a system and method for providing service-level monitoring for applications in SANs. Embodiments may identify what applications are running on which hosts in a SAN, automatically identify which paths the applications use through the storage infrastructure to reach their storage, and may monitor SAN components of the paths. One embodiment may provide a task group monitor that monitors groups of SAN components and reports problems detected on group members at the application level. Embodiments may proactively monitor SAN infrastructure including the hardware and/or software components of storage, hosts, fabric, etc. needed for scheduled application tasks such as backup tasks and may alert the operator when problems are detected. Thus, embodiments correlate detected infrastructure problems directly to the applications that are affected, allowing these problems to be addressed at the application level, and prior to scheduled execution of tasks. One embodiment may be implemented in a SAN management system.

23 Claims, 11 Drawing Sheets

SERVICE-LEVEL MONITORING FOR STORAGE APPLICATIONS

BACKGROUND OF THE INVENTION

1. Field of the Invention

This invention is related to the field of storage management and, more particularly, to software used in storage management.

2. Description of the Related Art

In the past, large organizations relied heavily on parallel SCSI technology to provide the performance required for their enterprise data storage needs. More recently, organizations are recognizing that the restrictions imposed by SCSI architecture are too costly for SCSI to continue as a viable solution. Such restrictions include the following:

- SCSI disk arrays must be located no more than 25 meters from the host server;
- The parallel SCSI bus is susceptible to data errors resulting from slight timing discrepancies or improper port termination; and
- SCSI array servicing frequently requires downtime for every disk in the array.

One solution has been to create technology that enables storage arrays to reside directly on the network, where disk accesses may be made directly rather than through the server's SCSI connection. This network-attached storage (NAS) model eliminates SCSI's restrictive cable distance, signal timing, and termination requirements. However, it adds a significant load to the network, which frequently is already starved for bandwidth. Gigabit Ethernet technology only alleviates this bottleneck for the short term, so a more elegant solution is desirable.

The storage area network (SAN) model places storage on its own dedicated network, removing data storage from both the server-to-disk SCSI bus and the main user network. This dedicated network most commonly uses Fibre Channel technology, a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices. The versatility of the SAN model enables organizations to perform tasks that were previously difficult to implement, such as LAN-free and server-free tape backup, storage leasing, and full-motion video services.

SAN management products may monitor SAN infrastructure components and the status of SAN applications. However, these products typically do not address the relationships between the SAN infrastructure components and the applications. If a problem is detected at the infrastructure level, typically this problem will be reported at the infrastructure component level and not at the application level. Thus, it is desirable to provide a mechanism for correlating infrastructure problems directly to the applications that are affected and addressing these problems at the application level.

Typically, for scheduled tasks such as backups, there is no easy way to proactively detect that the task may fail. For example, if a task is scheduled to run overnight, the operator may come in the next day to see what worked or did not work. Thus, it is desirable to provide a mechanism that monitors the SAN infrastructure to identify that all hardware and software that is needed to perform a scheduled task is online and ready to go and to notify the operator(s) if problems are detected in advance of the scheduled task.

SUMMARY OF THE INVENTION

Embodiments of a system and method for providing service-level monitoring for applications in storage area networks (SANs) are described. SANs may include hosts that run applications, storage devices that are used by the applications to store and retrieve data, and the fabric that allows data to be transported between hosts and storage devices. In a SAN, what is typically important is the applications, and the applications being able to go through the storage infrastructure to access specific storage devices for files. Embodiments may identify what applications are running on which hosts in a SAN, automatically identify which paths the applications use through the storage infrastructure to reach their storage, and may monitor SAN components of the paths (e.g. hosts, host applications, HBAs, HBA ports, switches, switch ports, hubs, bridges, storage devices, storage device ports, controllers on storage devices, LUNs, databases, files, and in general any aspect of the SAN components that may influence performance). One embodiment may provide a task group monitor that monitors groups of SAN components and reports conditions detected on group members that, for example, may affect performance of scheduled tasks at the SAN application level.

Embodiments may provide the ability to proactively monitor the SAN infrastructure including the hardware and/or software components of storage, hosts, fabric, etc. used by applications in SANs or needed for scheduled tasks and to alert the operator when problems are detected. Embodiments may tie SAN infrastructure hardware- and software-based alerts to the highest-level object in which a storage administrator is interested, for example one or more SAN applications or scheduled tasks of applications. Thus, embodiments may correlate detected infrastructure problems directly to the applications that are affected, allowing these problems to be addressed at the application level.

A SAN application on a host system of a SAN may schedule a task for execution on the SAN, for example a backup task. A task group monitor may discover or be notified of the scheduled task, and may generate a task group including one or more SAN components involved in performing the scheduled task. The task group monitor may then monitor the SAN components in the task group prior to scheduled execution of the task to detect conditions that may affect execution of the task. If a condition is detected, the task group monitor may generate an alert for the SAN application indicating that the condition affecting execution of the task has been detected. The task group monitor may continue to monitor the task group until the scheduled task begins execution or, alternatively, until the scheduled task completes execution. In one embodiment, the alert may also indicate one or more of the SAN components of the task group for which the condition affecting execution of the task is detected. In one embodiment, a notification of the alert may be provided to a human operator of the SAN application for resolution of the condition prior to the scheduled execution of the task. The operator may then resolve the condition indicated by the alert, if possible. If all such conditions are resolved, the task may be executed as scheduled. After execution of the task, the task group may be disbanded.

In one embodiment, one or more host systems of the SAN may implement a SAN management system. In this embodiment, the SAN management system may discover the SAN components and collect information from the SAN components. The task group monitor may access information on the SAN components discovered by the SAN management system to form task groups associated with SAN applications. In one embodiment, the task group monitor monitoring the SAN components in a task group may include accessing the information collected from the SAN components by the SAN management system.

Some embodiments may be implemented in network environments other than SAN environments to provide service-level monitoring for scheduled data transfer tasks. These embodiments may correlate detected network infrastructure conditions that may cause problems directly to scheduled data transfer tasks that may be affected, allowing these conditions to be proactively addressed.

BRIEF DESCRIPTION OF THE DRAWINGS

The following detailed description makes reference to the accompanying drawings, which are now briefly described.

Figure 1:
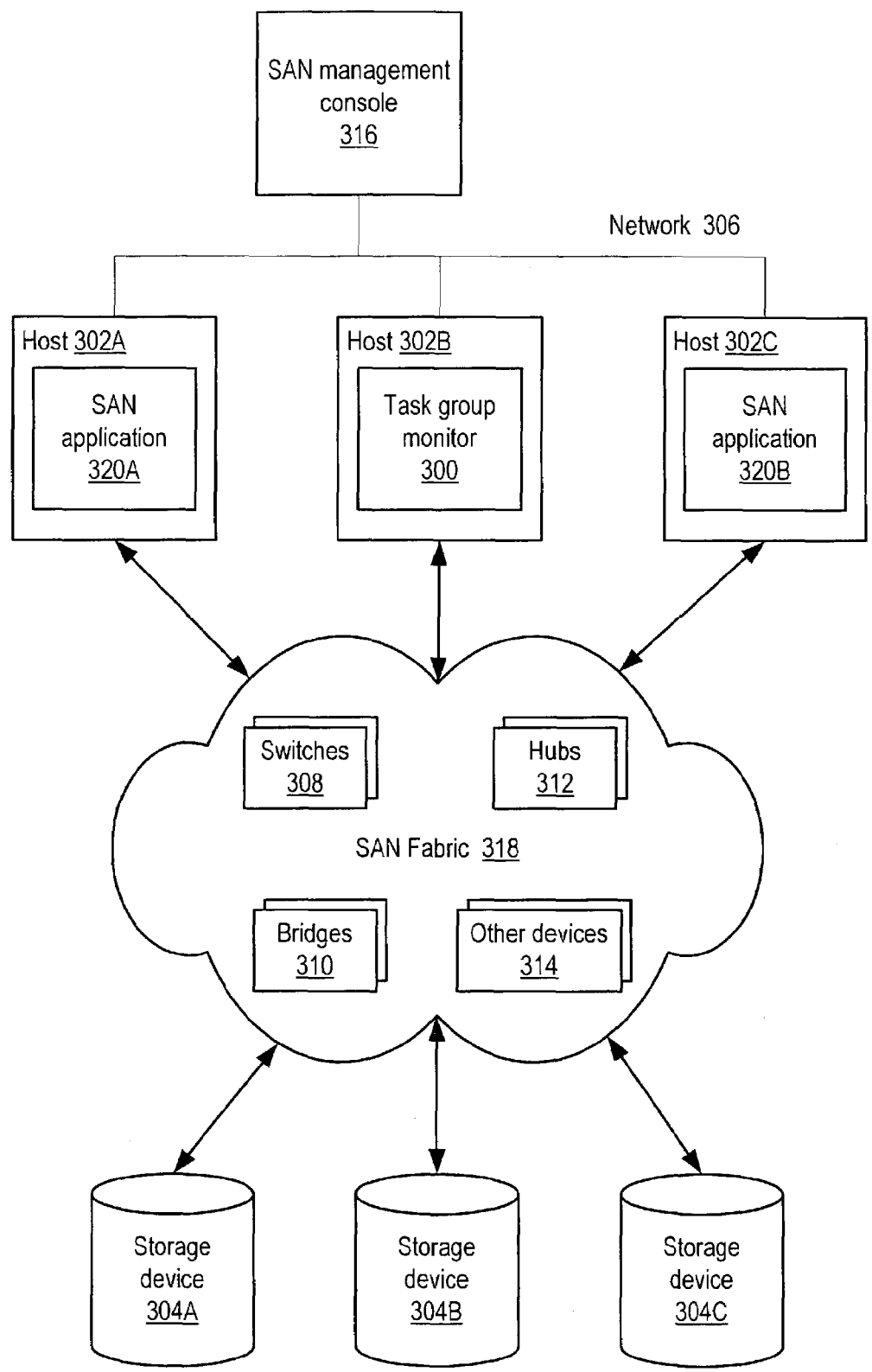
FIG. 1 illustrates an exemplary SAN implementing an embodiment of a task group monitor.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for providing service-level monitoring for applications in storage area networks (SANs) are described. SANs may include hosts that run applications, storage devices that are used by the applications to store and retrieve data, and the storage network (e.g. fabric) that allows data to be transported between hosts and storage devices. In a SAN, what is typically important is the applications, and the applications being able to go through the storage infrastructure to access specific storage devices for files. The files may include, but are not limited to, database tables or other specific files used by an application. For example, an Exchange server may have specific files it needs to reference on an array in a storage pool. Embodiments may identify what applications are running on which hosts in a SAN, automatically identify which paths the applications use through the storage infrastructure to reach their storage, and may monitor SAN components of the paths (e.g. hosts, host applications, HBAs, HBA ports, switches, switch ports, hubs, bridges, storage devices, controllers on storage devices, and in general any other aspects of the SAN components that may influence performance).

Embodiments may provide the ability to proactively monitor the SAN infrastructure including the hardware and/or software components of storage, hosts, fabric, etc. used by applications in SANs or needed for scheduled future operations such as backups (which may be referred to herein as tasks) and to alert the storage administrator(s), operator(s) or other users (which may be collectively referred to herein as operator) when problems are detected. Embodiments may tie SAN infrastructure hardware- and software-based alerts to the highest-level object in which a storage administrator is interested, for example one or more SAN applications or scheduled tasks of applications. Thus, embodiments correlate detected infrastructure conditions that may cause problems directly to the applications that are affected, allowing these conditions to be addressed at the application level.

Embodiments may provide the ability to detect problems in the SAN infrastructure before the problems are manifested. One embodiment may create groups of SAN components associated with SAN applications to be monitored. The group may be monitored for conditions (e.g. errors, status, usage metrics, etc.) If a condition is detected on any component in the group that may cause a problem (e.g. with execution of a scheduled task), the detected condition generates an alert. The alert may be redirected to a SAN application that owns the group, and an operator of the application may receive notification of the alert. Embodiments may be used to proactively provide notifications of alerts at the SAN application level so that an operator can head off application or scheduled task failures. For example, the SAN infrastructure required to perform a scheduled task such as a backup for an application may be monitored for a period in advance of the scheduled execution of the task. If a condition of any infrastructure component that may cause a problem is detected prior to the scheduled execution of the task, an application-level alert may be generated that allows an operator to address the condition prior to the scheduled execution.

As an example, a backup application (e.g. Backup Exec or Net Backup) on a SAN may schedule backup tasks to back up certain storage on a schedule. One embodiment may read the backup schedules, and before a backup task is scheduled to execute (e.g. 24 hours ahead of time), generate a group of SAN components involved in performing the scheduled backup task, and monitor the group to ensure that all the SAN components are ready to go before the backup task is scheduled to be executed. If a SAN component in the group generates an alert, an operator may be notified at the backup application level that the scheduled backup task may have a problem. In one embodiment, rather than or in addition to notifying an operator, notification may be sent to an automated error correcting mechanism that may perform service to correct at least some SAN conditions that may affect a scheduled task. For example, an error correcting mechanism may modify fabric zoning to correct a busy path or to zone around a disabled switch. In one embodiment, if the error correcting mechanism is notified of a condition that it cannot correct, the operator may be notified so that the operator may take corrective action. In one embodiment, after the backup task completes, the group may be disbanded.

Embodiments may monitor various SAN components including one or more of, but not limited to, SAN hosts, instances of applications running on SAN hosts, fabric components, and storage devices that may be used in performing scheduled tasks on the SAN, and may notify operator(s) if a condition is detected with any of the SAN components that may cause a problem. For example, a backup server, an instance of a database application, one or more storage devices storing the database which is the source of the backup data, one or more storage devices to be used as destinations for the backup, and one or more fabric components to be used in the transfer of data during the backup may be monitored prior to a scheduled backup task. If a condition that may cause a problem is detected during monitoring, for example if the backup server or the instance of the database application goes down, then an operator may be notified that the scheduled backup task may have a problem and may not execute. In one embodiment, one or more hosts on which instances of applications to be used in a scheduled task are running may also be monitored, and if a monitored host goes down, an operator may be notified that the scheduled task may not execute.

In one embodiment, one or more groups may be created that include all of the hardware and software SAN components that are needed by one or more SAN applications and/or one or more scheduled tasks of the applications to function properly. Groups may include one or more of, but are not limited to, application instances (e.g. backup servers, database applications, accounting packages, custom applications, etc.), hosts, clusters, HBAs, HBA ports, CPUs, switches, switch ports, JBODs, storage arrays, array ports, LUNs, disks, ports, hubs, bridges, routers, etc. Each member of the group may be monitored for conditions that may affect performance of the application or task. Conditions that may affect performance of the application or task may include one or more of, but are not limited to: errors on devices that may affect access or traversal of the SAN (CRC errors, cache read/write errors, device unreachable, etc); over-utilization that may cause access or traversal bottlenecks preventing successful task completion (frames dropped, 99% port bandwidth utilization, high CPU, etc.); status conditions that may render a component unavailable (device is turned off, application instance is not running, port is offline, etc.); etc.

If a condition that may affect performance is detected on any group member, then an alert may be issued at the application level identifying that there is a condition that may affect operation of the application and/or scheduled task. Regardless of which group member fails, the alert may indicate which application(s) and/or scheduled task(s) are affected. A notification of the application-level alert may be issued to an operator responsible for operations of the application and/or scheduled task. Notifications may be issued in one or more forms, including, but not limited to, console messages (to host systems or other systems attached to the SAN via the host systems), email messages, instant messaging, paging, etc. Additional information may be included in the notification that identifies or that can be used to identify the specific SAN component (group member) for which a condition that may cause a problem has been detected.

As an example, a group may be created for an instance of Oracle on a host system that includes a particular storage device used by the Oracle instance. The group may be monitored and, if the storage device goes offline, the offline status of the storage device may be detected. An operator of the Oracle instance may receive an application-level notification that indicates that the particular instance of Oracle cannot access a particular database, rather than just a status message indicating that the storage device is offline. The notification may also identify the specific SAN component for which a condition that may cause a problem has been detected, in this case the offline storage device.

One embodiment may use SAN component monitoring capabilities such as those provided by a SAN management system (e.g. the exemplary SAN management system described below) to monitor groups of SAN components associated with particular SAN applications, and may alert on conditions detected in a group at the associated SAN application level. In general, any SAN component that may affect a SAN application accessing its storage may be monitored. For example, a SAN Oracle application A may access storage through a switch A. If switch A fails, an alert may be generated at the SAN application level that may report, for example, "Oracle Application A will not be able to reach its storage because switch A failed." Embodiments may alert on each application that is set up to be monitored this way. Applications may include, but are not limited to, Oracle applications, Microsoft Exchange applications, volume managers, etc. In one embodiment, any type of application that may run on a SAN host may be monitored.

One embodiment may provide a utility with a user interface through which groups of SAN components may be created, associated with particular SAN applications, and configured to generate application-level alerts and notifications.

One embodiment may provide a task group monitor that monitors groups of SAN components and reports potential problem conditions detected on group members at the SAN application level. FIG. 1 illustrates an exemplary SAN implementing an embodiment of a task group monitor. For one embodiment, SAN may be described as a high-speed, special-purpose network that interconnects storage devices 304 (e.g. storage devices 304A, 304B, and 304C) with associated data servers (e.g. hosts 302A, 302B, and 302C) on behalf of a larger network of users. A SAN may employ Fibre Channel technology. A SAN may include one or more hosts 302 (e.g. hosts 302A, 302B, and 302C), one or more storage devices 304 (e.g. storage devices 304A, 304B, and 304C), and one or more SAN fabrics 318. A SAN may also include one or more management consoles 316. One or more end-user platforms (not shown) may access the SAN, typically via a LAN or WAN connection to one or more of the hosts 302.

Storage devices 304 may include one or more of, but are not limited to, RAID (Redundant Array of Independent Disks) systems, disk arrays, JBODs (Just a Bunch Of Disks, used to refer to disks that are not configured according to RAID), tape devices, and optical storage devices. Hosts 302 may run any of a variety of operating systems, including, but not limited to: Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions). Each host 302 is typically connected to the fabric 318 via one or more Host Bus Adapters (HBAs). SAN fabric 100 may enable server-to-storage device connectivity through Fibre Channel switching technology. SAN fabric 318 hardware may include one or more switches 308, bridges 310, hubs 312, or other devices 314 such as routers, as well as the interconnecting cables (for Fibre Channel SANs, fibre optic cables).

Host systems 302 may include one or more SAN applications 320 such as SAN application 320A on host 302A and SAN application 320B on host 302C. One or more host system 302 may include an instance of the task group monitor 300; in this example host 302B includes an instance of task group monitor 300. Task group monitor 300 may generate and monitor task groups each including one or more SAN components involved in performing a corresponding task on the SAN. These SAN components may include one or more of, but are not limited to, one or more other software and/or hardware components of the host systems 302 (e.g. Host Bus Adapters (HBAs), HBA ports, drivers, etc.), one or more software and/or hardware components of the fabric 318 (e.g. switches, switch ports, hubs, bridges, etc.), and one or more software and/or hardware components of the storage devices 304 (e.g. array ports, drivers, etc.) In one embodiment, one or more of SAN applications 320 may be included in a task group for monitoring. In one embodiment, a task may be included in a task group for monitoring. In generating a task group, task group monitor may generate and store information describing the task group and indicating the one or more members of the task group. In one embodiment, this information may be stored in one or more database tables.

In one embodiment, task group monitor 300 may monitor each of the SAN components in a task group by communicating with the SAN component via one or more in-band and/or out-of-band communication channels. For each SAN component in the task group, one or more parameters of the SAN component may be monitored. In one embodiment, parameters of components being monitored may include one or more of, but are not limited to, general status information (e.g. on-line or off-line status), error and failure information for the various components.

Figure 2:
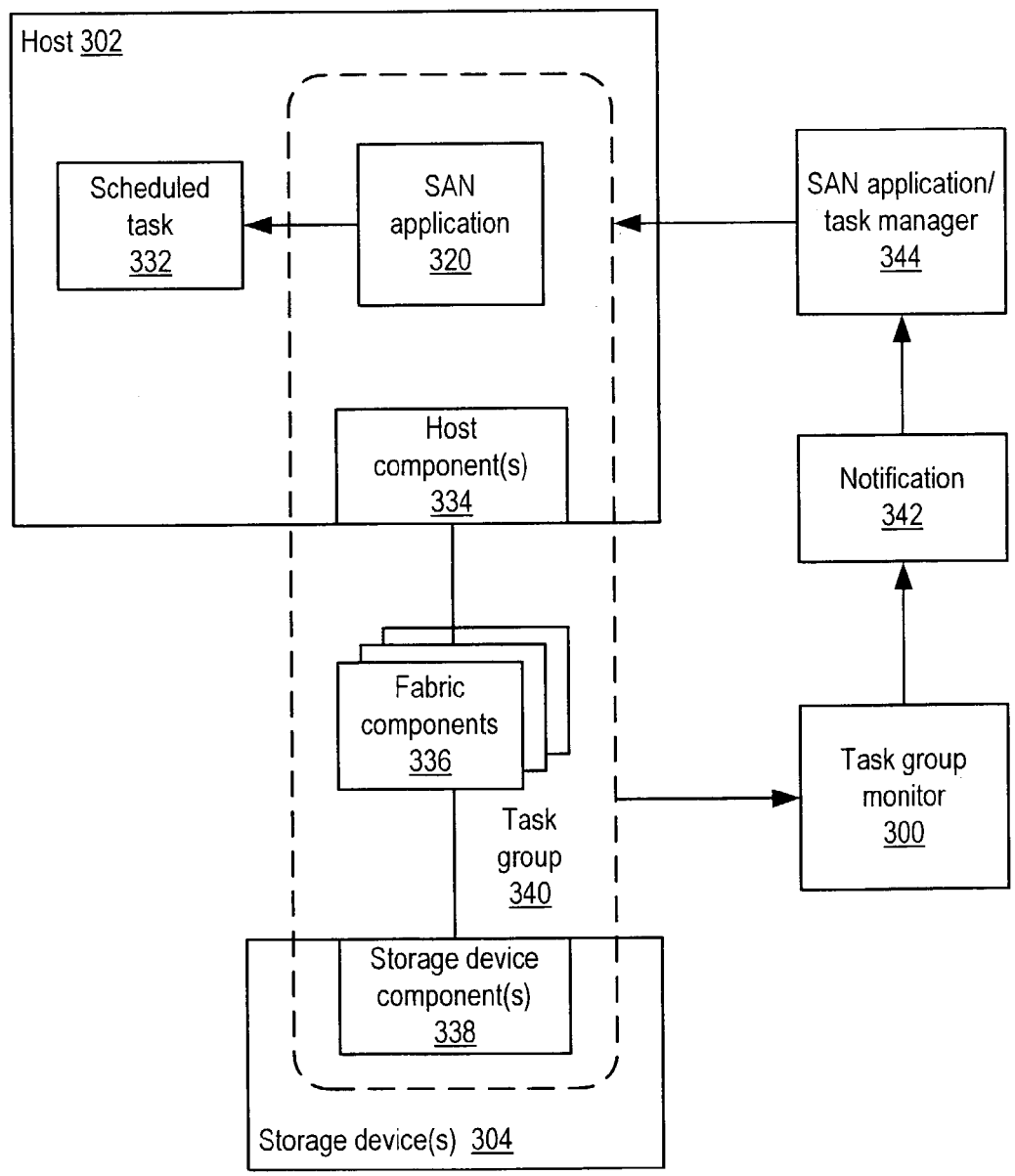
FIG. 2 illustrates an exemplary task group being monitored by a task group monitor for a scheduled task of an application, for example a scheduled backup task, according to one embodiment.

Task group monitor 300 may include means for grouping one or more SAN components involved in performing a task scheduled to execute on a SAN by a SAN application on a host system of the SAN. FIG. 2 illustrates an exemplary task group being monitored by a task group monitor for a scheduled task of an application, for example a scheduled backup task, according to one embodiment. SAN application 320 on host 302 may schedule a task 332 to be executed. Task group monitor 300 may discover, or alternatively may be notified of, the scheduled task 332. Task group monitor 300 may generate a task group 340 which may include one or more SAN components involved in performing the task 332 which are to be monitored. These SAN components may include one or more of, but are not limited to, the host system 302, one or more other software and/or hardware components 334 of the host system 302 (e.g. Host Bus Adapters (HBAs), HBA ports, drivers, processors, etc.), one or more software and/or hardware components 336 of the fabric (e.g. switches, switch ports, hubs, hub ports, bridges, etc.), and one or more software and/or hardware components 338 of the storage device 304 (e.g. array ports, drivers, etc.) In one embodiment, SAN application 320 may be included in task group 340 for monitoring. In one embodiment, scheduled task 332 may itself be included in a task group for monitoring. In generating the task group 340, task group monitor 300 may generate and store information describing the task group 340 and indicating the member components in the task group 340. In one embodiment, this information may be stored in one or more database tables.

The following is an exemplary task group 340 that may be generated by task group monitor 300 for a scheduled task 332 and is not intended to be limiting:

Task Group:
Application instance A (e.g. application 320)
Scheduled Task A (e.g. scheduled task 332)
Host A (e.g. host 302)
   Host processor A
   Host processor B
   HBA A
   HBA B
Switch A
   Switch Port A1
   Switch Port A2
Switch B
   Switch Port B1
   Switch Port B2
Hub A
   Hub port A1
   Hub port A2
Array A
   Array port A1
   Array port A2
   Array LUN A
   LUN Disk A1
   LUN Disk A2
   File A
   File B
   File C Task group monitor 300 may include means for monitoring the grouped SAN components prior to execution of the scheduled task 332 to detect conditions which may affect execution of the task. In one embodiment, task group monitor 300 may monitor each of the SAN components in the task group 340 by communicating with the SAN component via one or more in-band and/or out-of-band communication channels. For each SAN component in the task group 340, one or more parameters of the SAN component may be monitored. In one embodiment, parameters of components being monitored may include one or more of, but are not limited to, general status information (e.g. on-line or off-line status), error and failure information for the various components.

Task group monitor 300 may include means for alerting the SAN application if a condition affecting execution of scheduled task 332 is detected and means for providing a notification of the alert to an operator (e.g. SAN application/task manager 344) of the SAN application 320 for resolution of the condition prior to the scheduled execution of the task. If a condition affecting execution of scheduled task 332 is detected by the task group monitor 300 for one of the SAN components in the task group 340, then an alert may be generated by task group monitor 300 for SAN application 320. A notification 342 of the condition may be sent to an operator (e.g. SAN application/task manager 344) or operators of SAN application 320. For example, a console message may be displayed on a console notifying the operator(s) that a condition has been identified that may affect execution of the scheduled task 332. This notification 342 may include an indication of the particular condition and may indicate the particular SAN component in task group 340 for which the condition was detected. Alternatively, or in addition, an email message or other notification (e.g. a pager message) may be sent to the operator(s). After receiving the notification 342, the operator may, if possible, address the condition in task group 340 before scheduled execution of the task 332. In one embodiment, rather than or in addition to notifying an operator, a notification may be sent to an automated error correcting mechanism (not shown) that may perform service to correct at least some SAN conditions that may affect a scheduled task. In one embodiment, if the error correcting mechanism is notified of a condition that it cannot correct, the operator may be notified so that the operator may take corrective action.

In one embodiment, thresholds may be specified for some parameters, and if a threshold is crossed, alerts may be generated for the associated component and reported at the application level by the task group monitor 300. For example, a threshold may be set for packet or frame rate through a particular switch port and, if the task group monitor detects that the threshold for the switch port has been exceeded, then a notification may be sent to an operator of the application that the scheduled task may have a problem. In one embodiment, the notification may identify the switch port, the monitored parameter of the switch port for which a condition that may cause a problem has been detected, and the nature of the condition (in this example, that the frame threshold has been exceeded). In one embodiment, each SAN component in the task group 340 may be monitored for one or more parameters or conditions. In other words, alerts may be generated for one or more conditions or parameters being monitored on each component.

Figure 3:
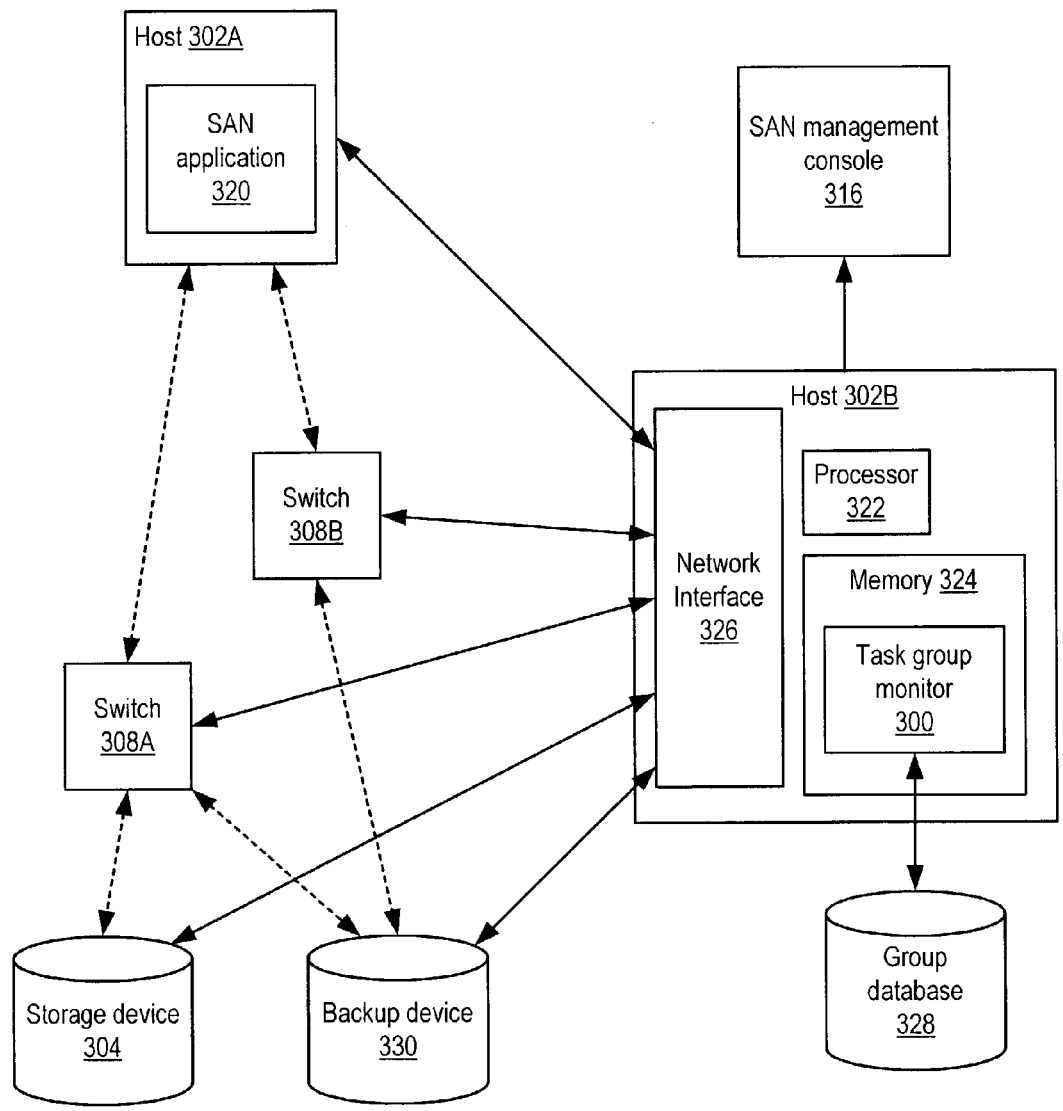
FIG. 3 illustrates an exemplary SAN with a host system including a task group monitor according to one embodiment.

FIG. 3 illustrates an exemplary SAN with a host system including a task group monitor according to one embodiment. Host systems 302 may be any of various types of devices, including, but not limited to, a personal computer system, desktop computer, laptop or notebook computer, mainframe computer system, workstation, network appliance, network computer, Internet appliance, or other suitable device. Host system 302B may include at least one processor 322. The processor 322 may be coupled to a memory 324. Memory 324 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Host system 302B may include, in memory 324, a task group monitor 300.

Host system 302B may couple to one or more SAN components such as other hosts 302, storage devices 304, backup devices 330, fabric components including switches 308, and other SAN components via network interface 332. Network interface 332 may include one or more network connections to one or more different types of communications networks. Task group monitor 300 may monitor groups of SAN components associated with SAN applications such as SAN application 320 on host 302A via one or more in-band and/or out-of-band network connections. Host system 302B may couple to the SAN components via one or more out-of-band network connections (e.g. Ethernet, LAN, WAN or other network connections). Host system 302B may also couple to the SAN components via one or more in-band network connections. In-band refers to transmission of a protocol other than the primary data protocol over the same medium (e.g. Fibre Channel) as the primary data protocol of the SAN. Out-of-band refers to transmission of information among SAN components outside of the Fibre Channel network, typically over Ethernet, on a LAN, WAN, or other network. Host system 302B may also couple to one or more of storage devices 304 and backup devices 330 via Fibre Channel through the SAN fabric for SAN data transmission using the primary data protocol.

In one embodiment, more than one host system 302 may include instances of task group monitor 300. While this example illustrates the task group monitor 300 on host system 302B of the SAN, in some embodiments, the task group monitor may reside on a non-host (e.g. end-user) system coupled to the SAN via a LAN or WAN connection to one or more of the host systems 302.

One embodiment of a system and method for providing service-level monitoring for applications in SANs may be implemented in a SAN management system such as the exemplary SAN management system described below. In one embodiment, a task group monitor may be implemented in a SAN management server such as the SAN management server of the exemplary SAN management system described below. In one embodiment, the SAN management system may discover information for SAN components including, but not limited to, hosts 302, applications 320, storage devices 304, backup devices 330, and fabric devices (e.g. switches 308), and the discovered information may be accessed by the task group monitor and used to form groups associated with applications 320 to be monitored. In one embodiment, the SAN management system may collect alert information from SAN components, for example using collectors of a SAN access layer of the exemplary SAN management system described below, and provide the collected alert information to the task group monitor 300. The task group monitor 300 may then identify one or more groups of SAN components being monitored that include SAN components associated with the alerts and generate application-level alerts for SAN applications 320 associated with the monitored groups. In one embodiment, group information may be stored in and accessed from a database of the SAN management system, for example, a SAN access layer data store of the exemplary SAN management system described below.

In one embodiment, the SAN management system may identify SAN applications and the paths from the SAN applications to the storage the SAN applications use, and may provide this information to the task group manager to be used in setting up and monitoring groups of SAN components for the applications. One embodiment may include application explorers similar to the explorers described for the exemplary SAN management system described below (e.g. volume manager explorer, Exchange explorer, Oracle explorer, etc.) that may be used to discover the SAN applications and obtain information from the SAN applications. These explorers may interact with APIs of the SAN applications (e.g. an Oracle API) to determine what storage the SAN applications are using. Using the explorers, discovery of the SAN applications may be performed automatically without user intervention. For SAN applications that cannot be automatically discovered, one embodiment may include a utility that may be used to inform the SAN management system about a particular SAN application on a particular host, the storage the application uses, and path information between the host and the storage. After entering the information, the task group manager may generate and monitor groups for the SAN application in a similar fashion as it does for SAN applications that are automatically discovered by the SAN management system.

Similarly to the SAN applications described above, in one embodiment, the SAN management system may be able to automatically discover one or more backup applications such as Net Backup, Backup Exec, etc., and may be able to read and understand the backup applications' backup schedules and other information. One embodiment may include backup application explorers similar to the explorers described for the exemplary SAN management system described below (e.g. a Backup Exec explorer, a Net Backup explorer, etc). These explorers may discover instances of the backup applications on the host systems, determine SAN components involved in performing backup tasks of the backup applications, pull the backup schedules, determine when backup schedules change, and generally gather and provide information about the backup applications to the task group monitor so that the task group monitor can generate and monitor groups of SAN components involved in performing backup tasks. For example, a host including a backup application may be configured to backup a disk array A to a tape drive B. In one embodiment, the task group monitor may access schedule information from the backup application (which may have been pulled from the host of the backup application by the SAN management system), determine if and when a backup task is scheduled and set up a task group to be monitored in advance of the scheduled execution of the backup task. The task group monitor may then monitor the task group, which may include one or more of, but is not limited to, tape drive B, disk array A, SAN components on the paths from the host to the tape drive B as well as the host to the disk array A, the backup application instance, and the host on which the backup application instance is running, in advance of the scheduled task. If a condition that may cause a problem is detected, the task group monitor may generate a backup application-level alert and notify an operator of the alert so that the condition may be addressed before the scheduled execution of the task. For serverless backups, a group may be generated and monitored for SAN components on a path from the storage (e.g. disk array A) to the backup device (e.g. tape drive B) directly.

In one embodiment, the task group monitor may use a policy service and policies of a SAN management system, such as the policy service and policies of the exemplary SAN management system described below, for example to associate groups of SAN components with SAN applications and to configure alerts and notifications for operators. In one embodiment, the groups may be defined in a SAN management system data store or database. A policy may include indication of a group or groups and may identify actions (e.g. notifications) to be performed if alerts, are generated on member SAN components of the group(s). In one embodiment, data collected from all grouped SAN components (e.g. by collectors) may be fed to the task group monitor. There may be multiple collectors for each SAN component. If the SAN component is in a group, any of the collectors associated with the SAN component that raises an alert will raise an alert at the application level of the SAN application associated with the group. For example, if the number of frames through a switch port in a group drops below a threshold, an alert may be triggered in a SAN application associated with the group that indicates that a condition has been detected that may cause a problem. In one embodiment, thresholds that may trigger events may be configurable so that specific events may be monitored and the monitoring of those events may be adjusted, if necessary or desired.

In the exemplary SAN of FIG. 3, application 320 may be a backup application, for example Net Backup. Application 320 may have scheduled a backup task, e.g. at 3:00 AM, to backup the storage on a set of Logical Unit Numbers (LUNs) in storage device 304 using backup device 330 (e.g. a tape device). The components may be connected over a SAN including, but not limited to, switch 308A (coupling host 302 to storage device 304) and switch 308B (coupling host 302 to backup device 330). In this example, there are three critical paths that may be added to one or more groups for monitoring: 1) The path from host 302 to storage device 304. 2) The path from host 302 to backup device 330 and 3) the path from storage device 304 to backup device 330. Hardware and/or software components on these paths may be included in one or more groups. The end-to-end path hardware and software components included in the group(s) may be monitored by task group monitor 300. Any conditions that may cause problems detected in the group members by the task group monitor 300 may be reported to an operator at the application 320 level (for example, at the Net Backup level). For example, if the task group monitor 300 detects that backup device 330 is offline, the operator(s) may be notified at the application level that the scheduled backup task may have a problem, specifically that backup device 330 needed for the scheduled backup task is offline. For example, a console message may be displayed on SAN management console 316 notifying the operator(s) that a condition has been identified that may affect the scheduled backup task. This notification may include, for example, an indication that the condition is that backup device 330 is offline. Alternatively, or in addition, an email message or other notification (e.g. a pager message) may be sent to the operator(s). After receiving the notification, the operator(s) may address the condition prior to execution of the scheduled task, if possible. In one embodiment, more than one application and/or scheduled task may be associated with a group and receive notification of identified conditions of member components of the group that may cause problems. In one embodiment, more than one group may be associated with an application or scheduled task, and the application or scheduled task may receive notifications of identified conditions of member components of the groups that may cause problems.

In one embodiment, the task group monitor may access information on scheduled tasks to set up groups and configure monitoring of scheduled tasks. For example, for backup tasks, a backup schedule may be read to determine which storage is to be backed up, where the storage is to be backed up to, and at what time the backup task is scheduled to start. A group may be created based on this information and monitored until the backup task has completed. This allows operators to be alerted to a potential problem with a scheduled task such as a backup task proactively, and to act on that notification to address the potential problem, before the task is scheduled to start, rather than discovering that the scheduled task failed the next day or receiving a call in the middle of the night that the task has failed. In one embodiment, after completion of a scheduled task being monitored, the group(s) set up for monitoring the task may be discarded.

Figure 4:
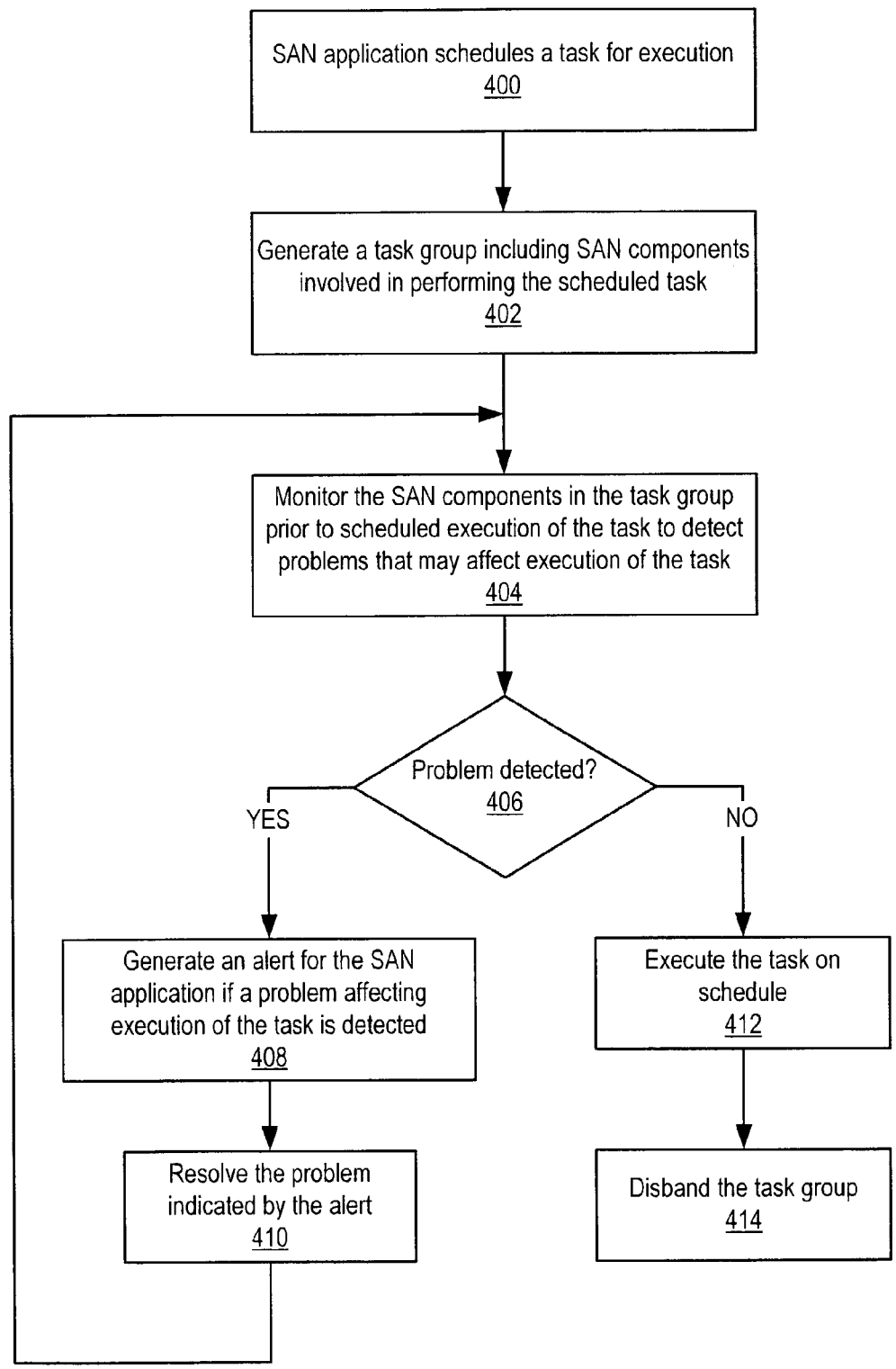
FIG. 4 is a flowchart illustrating a method of monitoring scheduled tasks according to one embodiment.

FIG. 4 is a flowchart illustrating a method of monitoring scheduled tasks according to one embodiment. As indicated at 400, a SAN application on a host system of a SAN may schedule a task for execution on the SAN, for example a backup task. A task group monitor may discover or be notified of the scheduled task, and may generate a task group including one or more SAN components involved in performing the scheduled task as indicated at 402. The task group monitor may then monitor the SAN components in the task group prior to scheduled execution of the task to detect conditions that may affect execution of the task as indicated at 404. For example, the task group monitor may monitor a group of SAN components associated with a backup task for 24 hours prior to the scheduled execution of the task. As indicated at 406, if a condition that may affect execution of the task is detected, the task group monitor may generate an alert for the SAN application indicating that a condition affecting execution of the task has been detected as indicated at 408. The task group monitor may continue to monitor the task group until the scheduled task begins execution or, alternatively, until the scheduled task completes execution. In one embodiment, the alert may also indicate one or more of the SAN components of the task group for which the condition affecting execution of the task is detected. In one embodiment, a notification of the alert may be provided to a human operator of the SAN application for resolution of the condition prior to the scheduled execution of the task. The operator may then resolve the condition indicated by the alert, if possible, as indicated at 410. If all conditions that may affect execution are resolved, the task may be executed as scheduled as indicated at 412. After execution of the task, the task group may be disbanded as indicated at 414.

In one embodiment, one or more host systems of the SAN may implement a SAN management system such as the exemplary SAN management system described below. In this embodiment, the SAN management system may discover the SAN components and collect information from the SAN components. The task group monitor may access information on the SAN components discovered by the SAN management system to form task groups associated with SAN applications. In one embodiment, the task group monitor monitoring the SAN components in a task group may include accessing the information collected from the SAN components by the SAN management system.

Organizations using SANs may include a plurality of divisions or departments. A SAN may be used by multiple departments in the organization. It may be desirable to isolate various departments (e.g. accounting, engineering, etc.) for event notification in the SAN. People running the departments may want to be alerted at a high level if something is wrong with one of the department SAN applications (e.g. servers, Oracle applications, Exchange applications, etc.). One embodiment may provide a level of grouping or "supergroup" above the application level groups where one or more specific applications that may be running on multiple host systems in a SAN are grouped into a department. A SAN may include one or more department groups, each including one or more SAN applications, which each may be associated with one or more groups of SAN components involved in performing tasks for the application. In this embodiment, alerts may be generated at the department level. For example, an accounting department may have a problem with an application (e.g. an Oracle server) running on a host because of a condition on the SAN hardware. An alert may be generated at the department level indicating that there is a problem with the application. In one embodiment, one or more notifications (e.g. console messages, email messages, instant messaging messages, pages, etc.) may be sent to department manager(s) indicating that there is a problem with the department SAN. The notification may identify the application for which a problem was detected, and may also identify a task of the application for which a problem was detected. In one embodiment, the notification may also indicate the SAN component for which a condition causing the problem was identified, and may also indicate the nature of the condition (e.g. for a scheduled backup, the tape drive is offline, the backup application is not running, the host on which the backup application resides is offline, etc.). Depending on how applications and/or SAN components are grouped, there may be different destinations for the notification messages sent out. In one embodiment, different notifications may be configured to go to one or more different department personnel.

For example, a supergroup of accounting department (application) groups may be formed. If there is a failure in any one of the groups in the accounting department supergroup, an alert may be sent to an accounting administrator. Oracle servers in the supergroup may be configured to alert on Oracle objects, the Oracle objects may be grouped into the accounting department, and alerts may be generated for the department. Notification of an alert may be sent to the accounting department manager or other employee responsible for the particular application or task for which the alert was generated. The employee may then drill down to find out that the alert is, for example, an Oracle problem, to find which Oracle server has the problem, and to find what SAN infrastructure component is causing the problem.

Figure 5:
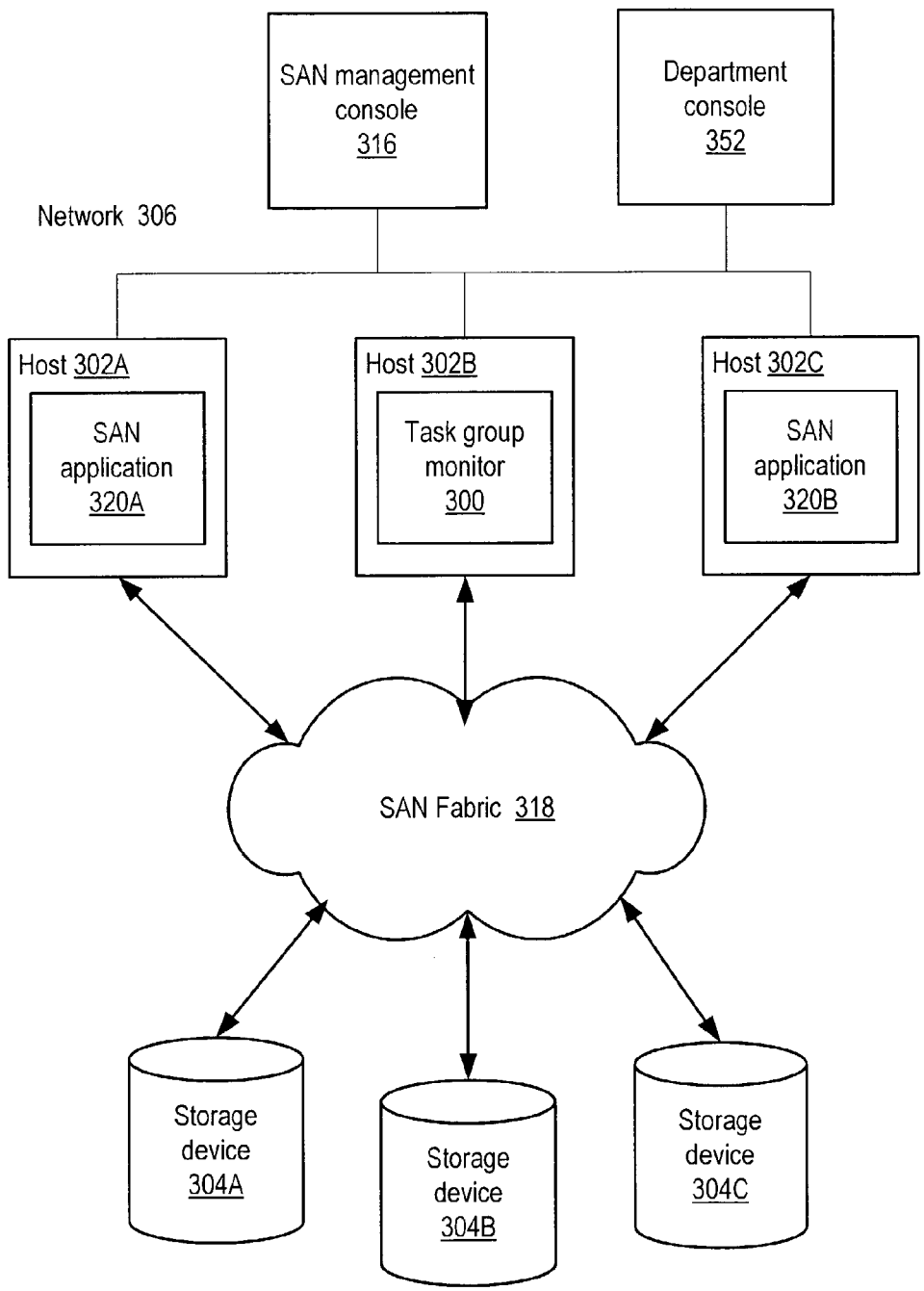
FIG. 5 illustrates an exemplary SAN implementing an embodiment of the task group monitor for department supergroups according to one embodiment.

One embodiment may provide a task group monitor that monitors department supergroups including groups of SAN components associated with one or more SAN applications of the department and reports problems detected at the department level. FIG. 5 illustrates an exemplary SAN implementing an embodiment of the task group monitor for department supergroups according to one embodiment. A SAN may include one or more hosts 302 (e.g. hosts 302A, 302B, and 302C), one or more storage devices 304 (e.g. storage devices 304A, 304B, and 304C), and one or more SAN fabrics 318. A SAN may also include one or more management consoles 316 and one or more department consoles 352. One or more other end-user platforms (not shown) may access the SAN, typically via a LAN or WAN connection to one or more of the hosts 302.

Host systems 302 may include one or more department SAN applications 320 such as SAN application 320A on host 302A and SAN application 320B on host 302C. One or more host system 302 may include an instance of the task group monitor 300; in this example host 302B includes an instance of task group monitor 300. Task group monitor 300 may monitor task groups of SAN components associated with department SAN applications 320 (e.g. SAN applications 320A and 320B). A task group may include one or more SAN components involved in performing a corresponding task to be monitored by task group monitor 300. In one embodiment, a task group may also include one or more of applications 320. In one embodiment, a task group may also include a scheduled task associated with the task group. If a condition is detected with any of the members of a task group that may cause a problem during monitoring of the task group, the task group monitor 300 may generate a department-level alert and send a notification to one or more department personnel of the problem. In one embodiment, a notification may include sending a console message to department console 352. Types of notifications may also include email messages, instant messages, pages, or other forms of notification.

Figure 6:
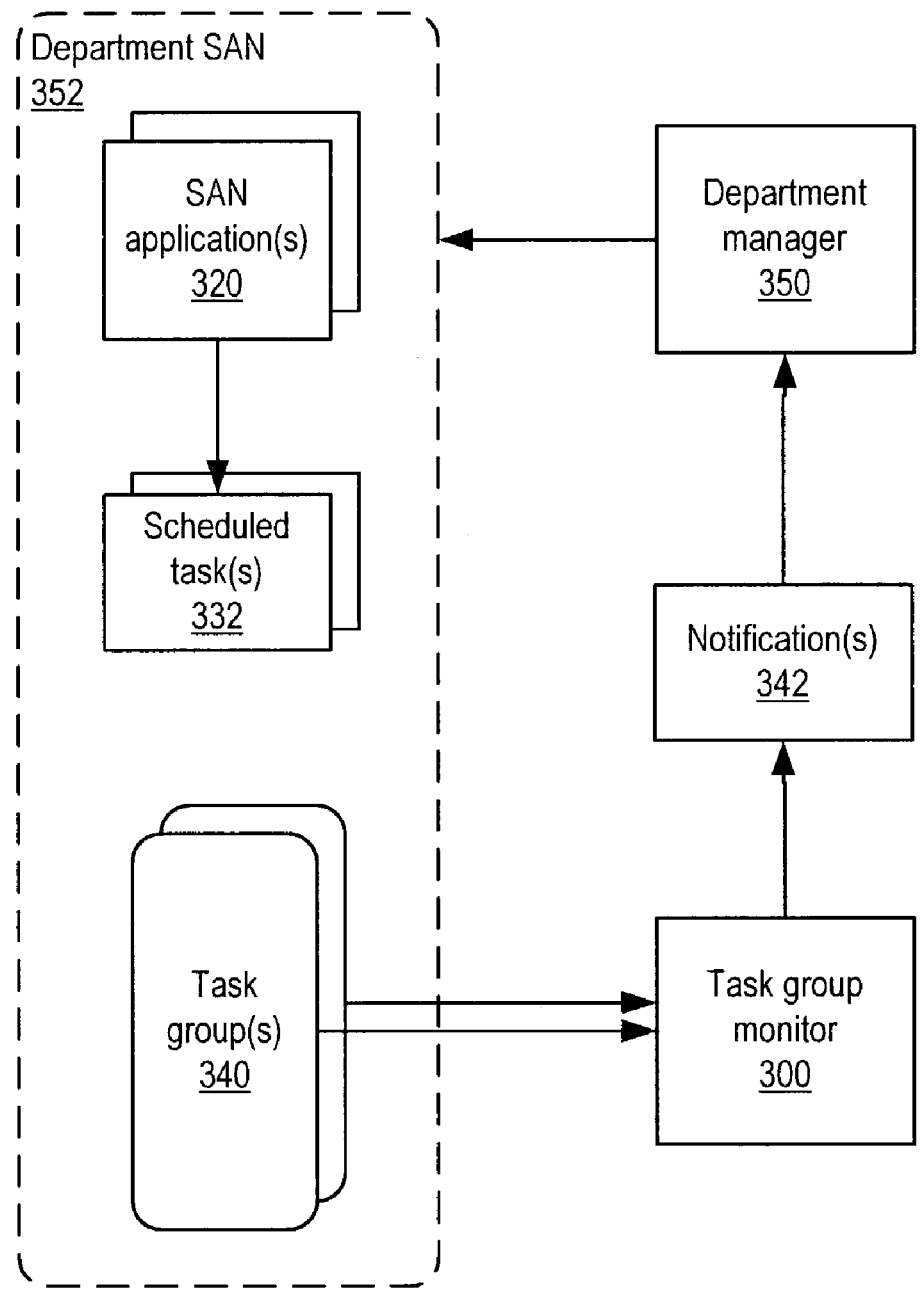
FIG. 6 illustrates an exemplary department SAN "supergroup" including one or more department SAN applications and their associated tasks and task groups being monitored by a task group monitor according to one embodiment.

FIG. 6 illustrates an exemplary department SAN "supergroup" including one or more department SAN applications and their associated tasks and task groups being monitored by a task group monitor according to one embodiment. Department SAN applications 320 may schedule one or more tasks 332 to be executed. Task group monitor 300 may discover, or alternatively may be notified of, the scheduled task(s) 332. Task group monitor 300 may generate one or more task groups 340 which may include one or more SAN components involved in performing the task(s) 332. Task group monitor 300 may generate a task group 340 which may include one or more SAN components involved in performing the task 332 which are to be monitored. These SAN components may include one or more of, but are not limited to, one or more other software and/or hardware components of host systems (e.g. Host Bus Adapters (HBAs), HBA ports, drivers, etc.), one or more software and/or hardware components of the fabric (e.g. switches, switch ports, hubs, bridges, etc.), and one or more software and/or hardware components of the storage device (e.g. array ports, drivers, etc.) In one embodiment, one or more of SAN applications 320 may be included in task group 340 for monitoring. In one embodiment, a scheduled task 332 may be included in a corresponding task group 340 for monitoring. In generating a task group 340, task group monitor 300 may generate and store information describing the task group 340 and indicating the member components in the task group 340. In one embodiment, this information may be stored in one or more database tables. Task group monitor 300 may then monitor the task group(s) 340 and provide department-level notification of problems detected with any of the task group(s).

In one embodiment, conditions of components being monitored may include general status information (e.g. on-line or off-line status) and error or failure information for the various components. In one embodiment, thresholds may be specified for some conditions, and if a threshold is crossed, alerts may be generated for the associated component and reported at the department level by the task group monitor 300. For example, a threshold may be set for packet rate through a particular switch port and, if the task group monitor detects that the threshold for the switch port has been exceeded, then a notification may be sent to a department manager that the task scheduled by the application may have a problem. In one embodiment, the notification may identify the switch port, the monitored parameter of the switch port that has a problem, the nature of the problem (in this example, that the packet threshold has been exceeded), the task for which a problem was detected, and/or the SAN application for which a problem was detected.

Some embodiments may provide different ways to associate groups. For example, groups of SAN applications may be made members of a path "supergroup." In this example, two or more SAN application may be associated with a particular path comprising one or more SAN components. A group may be created including the SAN components on the path to be monitored. A plurality of SAN applications may be grouped into a path supergroup, and an alert generated by any of the SAN components on the path may generate application-level alerts and notification of the alerts to all SAN applications in the path supergroup.

While embodiments are generally described herein in regards to SANs and SAN applications, it is noted that embodiments may be implemented in other network environments to provide service-level monitoring for scheduled data transfer tasks in those environments. These embodiments may provide the ability to detect potential problems in scheduled tasks involving data transfer over the network before the problems are manifested (i.e. before the scheduled tasks execute on the network). These embodiments may be used to proactively monitor the network infrastructure including the hardware and/or software components needed to perform a scheduled data transfer task and to generate alerts when conditions are detected in the infrastructure that may affect the scheduled task. Thus, these embodiments correlate detected network infrastructure conditions that may cause problems directly to scheduled tasks that may be affected, allowing these conditions to be addressed at the task level.

One embodiment may include a task group monitor that may create task groups of network software and/or hardware components needed to perform scheduled tasks. In one embodiment, if a condition that may affect execution of a scheduled task on a network is detected in any component in a task group associated with the task, an operator responsible for the task may be notified by the task group monitor that there is a problem that may affect the scheduled execution of the task. In one embodiment, the notification may indicate a particular network component for which a condition was detected that may affect execution of the data transfer task. In one embodiment, rather than or in addition to notifying an operator, the task group monitor may send notification to an automated error correcting mechanism that may perform service to correct at least some infrastructure conditions that may affect a scheduled task. In one embodiment, if the error correcting mechanism is notified of a condition that it cannot correct, the operator may be notified so that the operator may take corrective action.

Embodiments may be used to monitor network software and/or hardware components to be used by scheduled data transfers over a network. Embodiments may monitor network components to be used by scheduled tasks to transfer any kind of data, including, but not limited to, storage or backup data, financial transactions such as transactions or receipts of credit card companies, voice data, files, etc. In one embodiment, schedules for data transfer tasks may be maintained on a central server or on a distributed site setup. A schedule may be accessed to set up a task group for monitoring that may be used to monitor the specific network components involved in performing a scheduled data transfer task before execution of the task. The specific network components involved in performing a scheduled data transfer may be referred to as a network path. Network components that may be included in a network path may include one or more of, but are not limited to, computer systems, storage devices, routers, switches, repeaters, hubs, bridges, etc. In one embodiment, software applications needed to perform a scheduled data transfer (e.g. applications, servers, etc.) may also be included in the network path. A scheduled data transfer task may not always use the same network path. For example, a scheduled data transfer task may use different network paths (and thus different network components, although different network paths may include one or more of the same network components) based on a projected volume of data for particular scheduled executions of the task. Thus, embodiments may read a data transfer task schedule, determine what network path is to be used for a particular scheduled execution of the task, and set up and perform monitoring of the software and/or hardware components of the network path before execution of the scheduled task to make sure the components of the network path are available for the scheduled execution.

Figure 7:
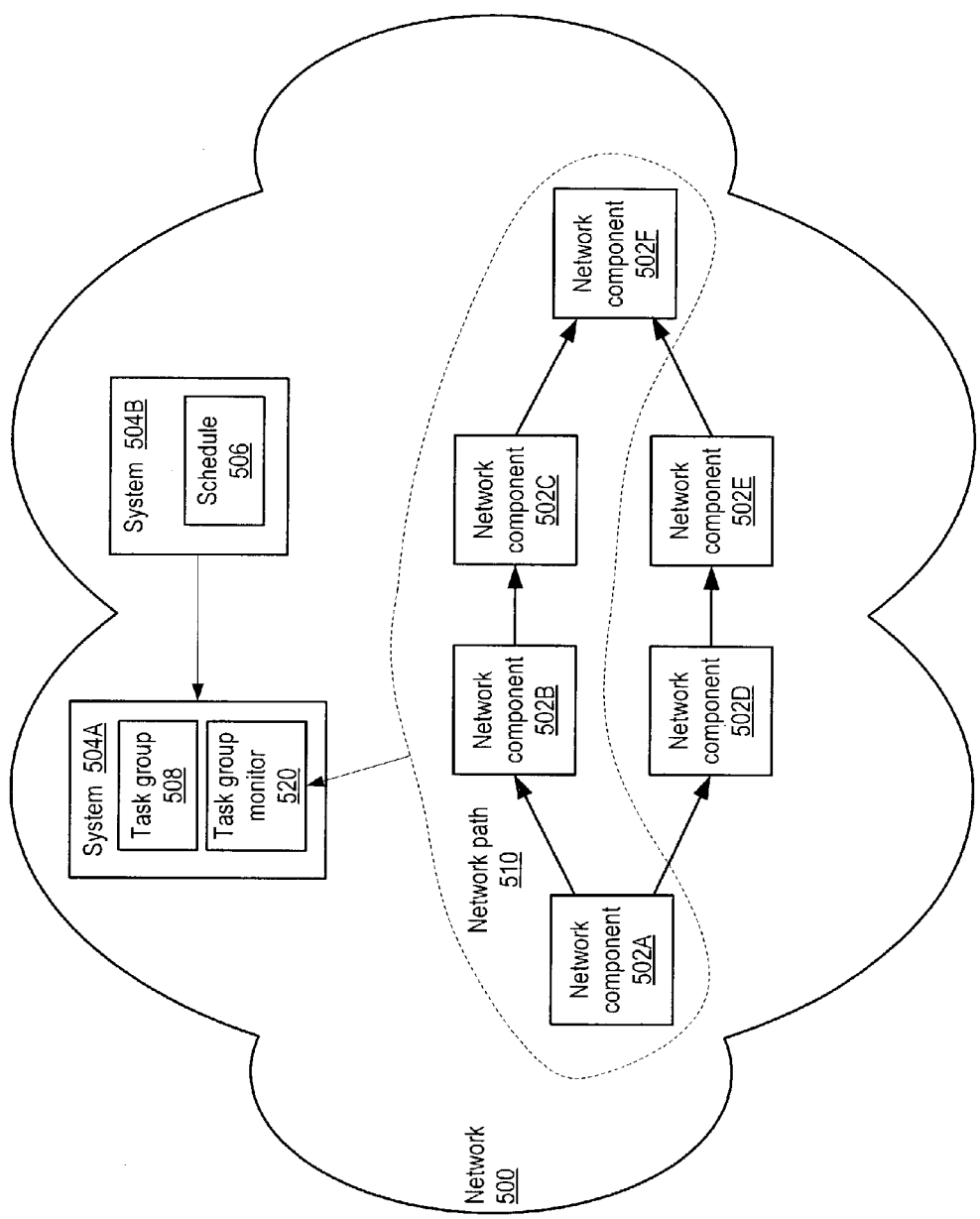
FIG. 7 illustrates a network implementing service-level monitoring for scheduled data transfer tasks according to one embodiment.

FIG. 7 illustrates a network implementing service-level monitoring for scheduled data transfer tasks according to one embodiment. A data transfer task may be scheduled to transfer data from network component 502A to network component 502F. In this example, there are two possible network paths between network components 502A and 502F. A first network path includes network components 502A, 502B, 502C and 502F. A second network path includes network components 502A, 502D, 502E and 502F. System 504A may include a task group monitor 520. Task group monitor 520 may access a schedule for the data transfer task, for example on system 504A, to determine the network path (e.g. network path 510) to be used by a next scheduled execution of the data transfer task. Note that the data transfer task may be scheduled to execute more than once. For example, a data transfer task may be scheduled to execute daily, weekly, or on other regular or irregular schedules. Executions of the scheduled data transfer task may not always use the same network path. For example, a scheduled data transfer task may use different network paths based on a projected volume of data for particular scheduled executions of the task. Task group monitor 520 may determine from the schedule that the data transfer task is configured to use network path 510 on its next scheduled execution, and may also determine that network components 502A, 502B, 502C and 502F are in the network path 510. Task group monitor 520 may generate a task group 508 from the information collected from schedule 506. Task group monitor 520 may then monitor task group 508 prior to execution of the data transfer task to detect conditions on any of the network components 502 in task group 508 that may affect execution of the data transfer task. If a condition that may affect execution of the data transfer task is detected, task group monitor may generate and send a notification to an operator responsible for the data transfer task so that the condition may be addressed prior to execution of the data transfer task, if possible. After execution of the task, task group 508 may be disposed of. Task group monitor 520 may be configured to access the schedule 506, generate a task group 508, and monitor the task group 508 prior to each scheduled execution of the data transfer task.

SAN Management System

Embodiments of a centralized Storage Area Network (SAN) management system are described. Embodiments of the system and method for providing service-level monitoring for applications in SANs as described above may be implemented in SANs managed with embodiments of the SAN management system to create and configure virtual fabrics. In one embodiment, a task group manager as described above may be integrated with a SAN management server as described below to generate and monitor groups of SAN components associated with SAN applications and to generate application-level alerts and notifications for alerts generated by the SAN components in the groups.

Figure 8:
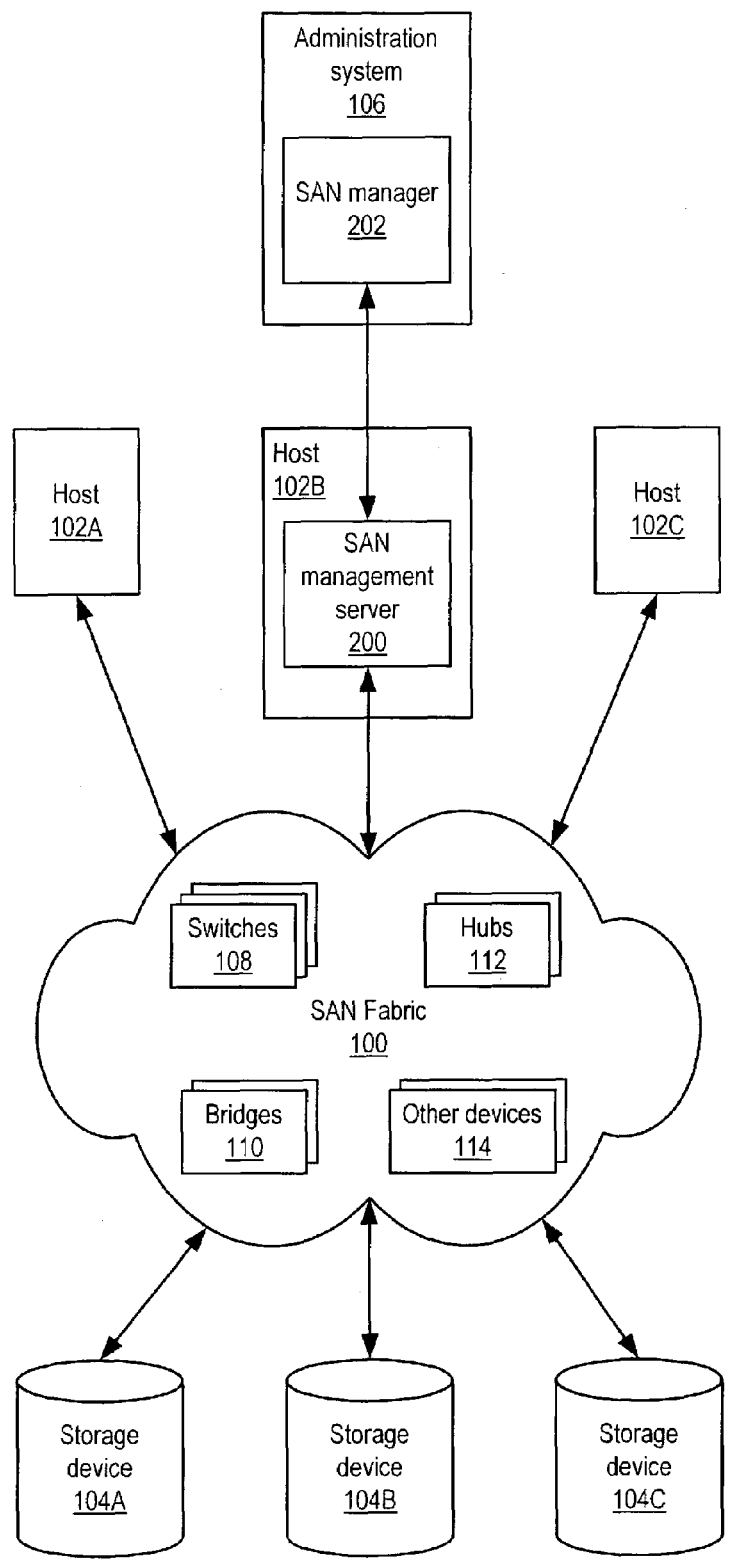
FIG. 8 shows an exemplary SAN implementing an embodiment of the SAN management system.

FIG. 8 shows an exemplary SAN implementing an embodiment of the SAN management system. For one embodiment, SAN may be described as a high-speed, special-purpose network that interconnects storage devices 104 (e.g. storage devices 104A, 104B, and 104C) with associated data servers (e.g. hosts 102A, 102B, and 102C) on behalf of a larger network of users. A SAN may employ Fibre Channel technology. A SAN may include one or more hosts 102 (e.g. hosts 102A, 102B, and 102C), one or more storage devices 104 (e.g. hosts 102A, 102B, and 102C), and one or more SAN fabrics 100. A SAN may also include one or more administration systems 106. One or more end-user platforms (not shown) may access the SAN, typically via a LAN or WAN connection to one or more of the hosts 102.

Storage devices 104 may include, but are not limited to, RAID (Redundant Array of Independent Disks) systems, disk arrays, JBODs (Just a Bunch Of Disks, used to refer to disks that are not configured according to RAID), tape devices, and optical storage devices. Hosts 102 may run any of a variety of operating systems, including, but not limited to: Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions). Each host 102 is typically connected to the fabric 100 via one or more Host Bus Adapters (HBAs). SAN fabric 100 may enable server-to-storage device connectivity through Fibre Channel switching technology. SAN fabric 100 hardware may include one or more switches 108, bridges 110, hubs 112, or other devices 114 such as routers, as well as the interconnecting cables (for Fibre Channel SANs, fibre optic cables).

Embodiments may simplify and centralize the management of heterogeneous SANs to enable control of SAN resources including, but not limited to, logical volumes, fibre channel adapters, and switches 108, as well as storage devices 104. A logical volume is a virtual disk made up of logical disks. A logical disk (also referred to as a logical device) is a set of consecutively addressed FBA (Fixed Block Architecture) disk blocks that is part of a single virtual disk-to-physical disk mapping. Logical disks are normally not visible to the host environment, except during array configuration operations. A virtual disk is a set of disk blocks presented to an operating environment as a range of consecutively numbered logical blocks with disk-like storage and I/O semantics. The virtual disk is the disk array object that most closely resembles a physical disk from the operating environment's viewpoint.

Embodiments may provide centralized management of SAN-connected devices with automatic discovery, visualization, access control, and policy-based monitoring, alerting and reporting. Embodiments may provide a single point of management from logical unit to interconnect to SAN-connected hosts 102. A LUN (logical unit number) is the SCSI (Small Computer System Interface) identifier of a logical unit within a target, the system component that receives a SCSI I/O command. A logical unit is an entity within a SCSI target that executes I/O commands. SCSI I/O commands are sent to a target and executed by a logical unit within that target. A SCSI physical disk typically has a single logical unit. Tape drives and array controllers may incorporate multiple logical units to which I/O commands can be addressed. Each logical unit exported by an array controller may correspond to a virtual disk. An interconnect is a physical facility by which system elements are connected together and through which they can communicate with each other (e.g. I/O buses and networks.)

Embodiments may provide data-centric management from host applications through interconnects to the storage resources, regardless of the underlying hardware and operating system(s). SAN management may occur at physical and logical levels to maintain control regardless of the underlying device environment. With the discovery of host attributes like OS platform, OS handles and IP address, the critical link associating logical devices to a host 102 and its applications may be made.

One embodiment may include a SAN management server 200 and one or more SAN managers 202. SAN management server 200 may discover SAN objects and their attributes, and may provide event management, policy management, and/or notification services. SAN management server 200 may explore the SAN to make data available to client applications, including SAN manager 202. SAN management server 200 may run in a variety of operating systems including, but not limited to: Solaris 2.6, 7, 8, 9, etc.; Linux; AIX; HP-UX 11.0b, 11i, etc.; Microsoft Windows NT 4.0 (Server and Enterprise Server) and Microsoft Windows 2000 (Server, Advanced Server and Datacenter Editions). One embodiment may include an integrated volume manager that may provide capabilities including, but not limited to, pooling storage across multiple heterogeneous arrays on the SAN. The SAN management system may automatically discover and display volumes within its interface. Additionally, adding storage to a host may be streamlined though the SAN management system. In one embodiment, when zoning storage to a host, an operating system rescan may be automatically initiated so that the new device is immediately available for use by the volume manager on the host.

Embodiments may reduce or eliminate the manual task of tracking of devices and their connections in the SAN by automatically discovering the physical and logical connections of the SAN, displaying the information in a graphical topology map and logging the data in a variety of inventory reports. One embodiment may enable the automatic discovery of SAN resources using one or more in-band and/or out-of-band protocols and industry standards (e.g. MS/CT, GS-3, SNMP, Fibre Alliance MIB, ANSI T11, SCSI, CIM (Common Information Model), vendor-specific extensions, etc.). Using both in-band and out-of-band protocols, and leveraging industry standards, the SAN management system may automatically capture and display details, including, but not limited to, device driver version, firmware level, status, performance, free and in-use port count, hardware manufacturer, model number and worldwide name (WWN). In-band refers to transmission of a protocol other than the primary data protocol over the same medium (e.g. Fibre Channel) as the primary data protocol. Out-of-band refers to transmission of management information for Fibre Channel components outside of the Fibre Channel network, typically over Ethernet. In one embodiment, a storage administrator may assign customized attributes to devices in the SAN for use in tracking information such as physical location, account code, installation date and asset tag number.

SAN manager 202 may provide a central management interface for various SAN management tasks, and may provide a graphical user interface for displaying the information (e.g. XML data) compiled by and received from SAN management server 200 in graphical and/or textual format, and may provide a user interface for accessing various features of the SAN management system such as tools and utilities. SAN manager 202 may run on any of a variety of end-user platforms coupled to one or more of the hosts 102, typically via a LAN or WAN, or alternatively may run on one of the hosts 102, including the host 102 that includes SAN management server 200. One embodiment may provide in-context launch support for element managers supplied by device vendors to provide vendor-specific management. In one embodiment, to directly manage a device, the administrator may telnet to the device via the SAN manager.

Embodiments may provide customizable, intuitive views into a SAN based on host 102, device, fabric 100, or storage groups, as well as real-time alerts to diagnose and avoid outages. In one embodiment, SAN manager 202 may serve as a centralized point from which a user may view information about a SAN, including, but not limited to, information about the SAN's topology and heterogeneous components. In one embodiment, SAN manager 202 may provide a graphical user interface (GUI) to display information from the SAN access layer and other SAN management server components.

In one embodiment, SAN manager 202 may provide a GUI for facilitating management by allowing the user to graphically drill down into the logical and physical devices on the SAN. One embodiment may provide the ability to zoom in or out on areas of interest in a SAN topology map to simplify the navigation of a growing enterprise SAN. Within the topology map, integrated tool tips may be provided to help identify devices and paths in the SAN without having to navigate through a complex topology. Information on SAN devices, such as hosts 102 with Host Bus Adapters (HBAs), interconnects, and storage devices 104, may be displayed in context in the GUI, revealing resources in zones as they are physically and logically connected. One embodiment may include a search mechanism. For example, if the administrator wants to ensure that all interconnects in the SAN are at the same firmware level, the administrator may query an integrated search tool for firmware levels to automatically locate all the devices that match the search criteria for the specific firmware level.

One embodiment may provide a real-time alert viewer that may monitor heterogeneous device status, and may provide proactive management capabilities in the SAN environment. Through policies, the status and performance of the device(s) may be monitored, and alerts may be generated when behavior falls outside acceptable boundaries. Embodiments may enable intelligent monitoring through user-definable threshold levels and may perform actions automatically as well as notify administrators of critical events in real time.

Embodiments may provide both real-time and historical performance data for critical service-level parameters such as connectivity, available space and throughput. One embodiment may enable real-time performance charting of SAN devices. Embodiments may monitor interconnect and storage devices in real time, and may be used to display information about the various SAN devices such as current load/status. Through real-time performance monitoring, with flexible user-defined thresholds, one embodiment may notify administrators about issues that could affect overall SAN performance before the issues have an impact. Logging this data for reporting may, for example, extend the administrator's capability to audit and validate service-level agreements.

One embodiment may include a SAN reporter that enables the user to generate and view reports on details of the SAN. In one embodiment, the SAN manager may serve as a centralized point from which reports may be generated and viewed. Embodiments may provide both real-time and historical performance data for critical service-level parameters such as connectivity, available space and throughput. In one embodiment, the SAN management server may collect SAN data that may be provided as real-time and/or historical performance data to the SAN reporter for use in generating SAN performance reports. One embodiment may include "out-of-the-box" or predefined reports that allow users to inventory and analyze their SANs. Embodiments may provide detailed capacity reports to aid in growth planning and gathers detailed information for use in chargeback reports. One embodiment may track LUN allocation to hosts as well as to storage groups, distilling real-time and historical reports that show where storage resources are being consumed.

Figure 9:
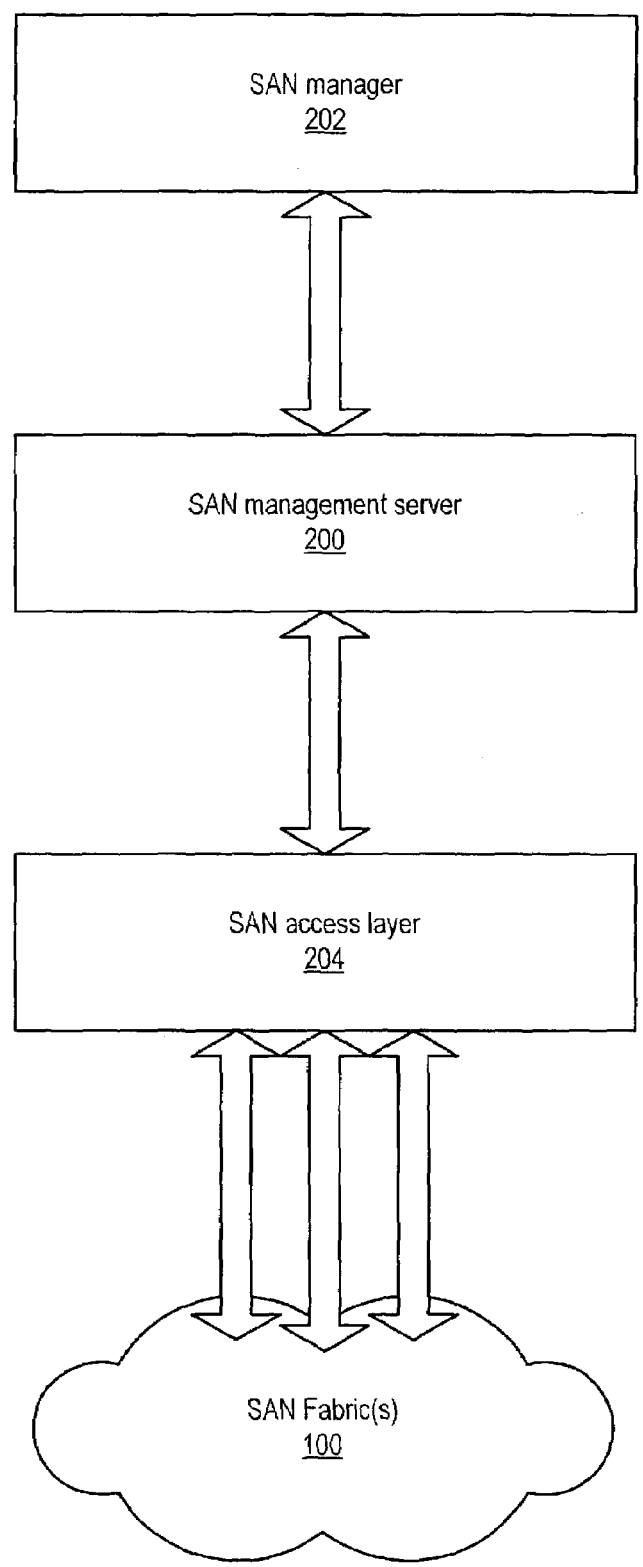
FIG. 9 illustrates the architecture of the SAN management system according to one embodiment.

FIG. 9 illustrates the architecture of the SAN management system according to one embodiment. This embodiment may be based on distributed client-server architecture, and may be divided into components that may include a SAN manager 202, a SAN management server 200, and a SAN access layer 204. The functions of SAN management server 200 may include one or more of, but are not limited to: automatically discovering SAN-attached objects including hosts, HBAs, switches and storage devices; maintaining a data store of real-time object information; managing SAN resources through zoning and LUN access control; monitoring conditions on the SAN; performing policy-based actions in response to SAN conditions; generating inventory and performance reports; and supporting user-defined grouping of objects based on quality of service (QoS) criteria.

By discovering objects and the relationship of these objects to each other, SAN access layer 204 may maintain a real-time topology of the SAN. SAN access layer 204 may also directly interface with switches on one or more fabrics to manage the zoning of storage resources. SAN access layer 204 may discover additional information about objects on the SAN that SAN management server 200 cannot discover directly, such as devices on a separate zone or fabric 100.

SAN manager 202 may be a central point for the user to perform one or more of SAN management tasks including, but not limited to, administering the SAN, viewing topographical displays of discovered objects on the SAN, accessing detailed information on components including object attributes and connectivity, creating and modifying policies, administering access control through zoning and LUN security, monitoring SAN events including real-time alerts, allocating storage resources, generating and viewing inventory and performance reports, generating and viewing real-time and historical reports, and/or launching utilities, tools and applications, which may include third-party management tools. In one embodiment, other applications, such as a Web browser, may function as clients to SAN management server 200. In one embodiment, multiple SAN managers 202 may connect simultaneously with SAN management server 200. One embodiment may include a command line interface that enables the user to query and modify SAN management server alarm service objects, configuration settings and perform other related SAN management system tasks.

Figure 10:
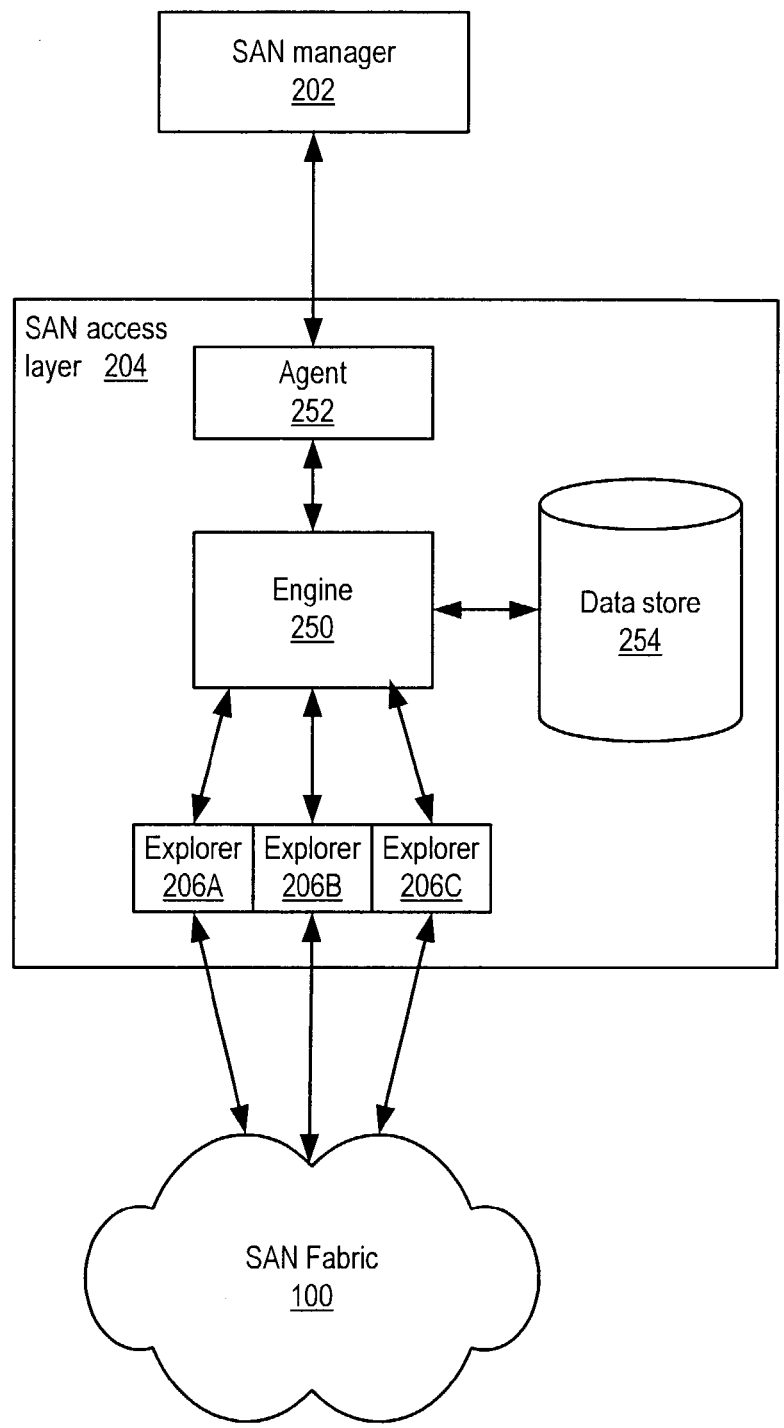
FIG. 10 illustrates the architecture of the SAN access layer according to one embodiment.

FIG. 10 illustrates the architecture of SAN access layer 204 according to one embodiment. In one embodiment, SAN access layer 204 may include an engine 250 that may perform one or more functions which may include, but are not limited to, coordinating the activity of explorers 206, managing changes to data store 254, and performing zoning operations by communicating with switches on fabric 100. In one embodiment, SAN access layer 204 may include one or more explorers that provide an interface to different types of heterogeneous SAN components so that the SAN management system may provide a common data representation for heterogeneous SAN components. Explorers 206 may communicate with the SAN components over Fibre Channel (in-band) and/or Ethernet (out-of-band) connections to inventory the SAN. Each explorer may communicate with a specific type of device using a protocol available for that specific type of device.

Once the SAN is discovered, SAN access layer 204 may continue to monitor the SAN and may update data store 254 as new events occur on the SAN. In one embodiment, SAN access layer 204 may periodically examine the SAN, for example to discover or determine objects that are added, objects that are removed, and connections that are pulled. In one embodiment, data gathered by the explorers may be aggregated into data store 254, which may be updated with real-time information about objects on the SAN. In one embodiment, SAN access layer engine 250 may manage data store 254. In one embodiment, data store 254 may be an embedded, ODBC-compliant, relational database. In one embodiment, data from the database may be imported into a data warehouse to track changes and analyze the SAN over periods.

In one embodiment, SAN access layer 204 may include an agent 252 that translates information from data store 254 into formatted files (e.g. XML files), which may be provided to client applications such as SAN manager 202 or Web browsers. Agent 252 may also enforce user authentication for commands sent to SAN management server 200, and may handle communication between SAN management server 200 and any hosts running a SAN access layer remote (described below).

In one embodiment, SAN manager 202 is a client of SAN access layer 204, and may graphically and/or textually display objects discovered by SAN access layer 204. In one embodiment, SAN manager 202 may open a connection (e.g. TCP/IP socket) with SAN access layer agent 252 and send a message (e.g. an XML message) requesting data stored in data store 254. Upon receiving the request, SAN access layer engine 250 may dynamically create a document (e.g. an XML document) describing the SAN topology. SAN access layer agent 252 then may send this document to SAN manager 202.

Once SAN manager 202 successfully receives the message, SAN access layer agent 252 may close the connection. When SAN manager 202 receives the document, it may read the file and display, in graphical and/or textual format, the information the document provides about the SAN.

In one embodiment, the data generated by SAN access layer 204 may be in a format (e.g. XML) that may be read by a Web browser or exported to a file that may be opened and edited using a standard text editor. In one embodiment, a SAN's current state may be captured in a file, e.g. an XML or other markup language file. Thus, snapshots of the SAN may be saved over time, which may be analyzed and compared to current conditions on the "live" SAN.

In one embodiment, SAN access layer 204 may be configured for discovery and device communication through a configuration file. The configuration file may include one or more parameters for the SAN access layer and/or globally for the explorers. Each type of explorer may have a section in the configuration file that may include one or more parameters specific to the particular type of explorer.

Figure 11:
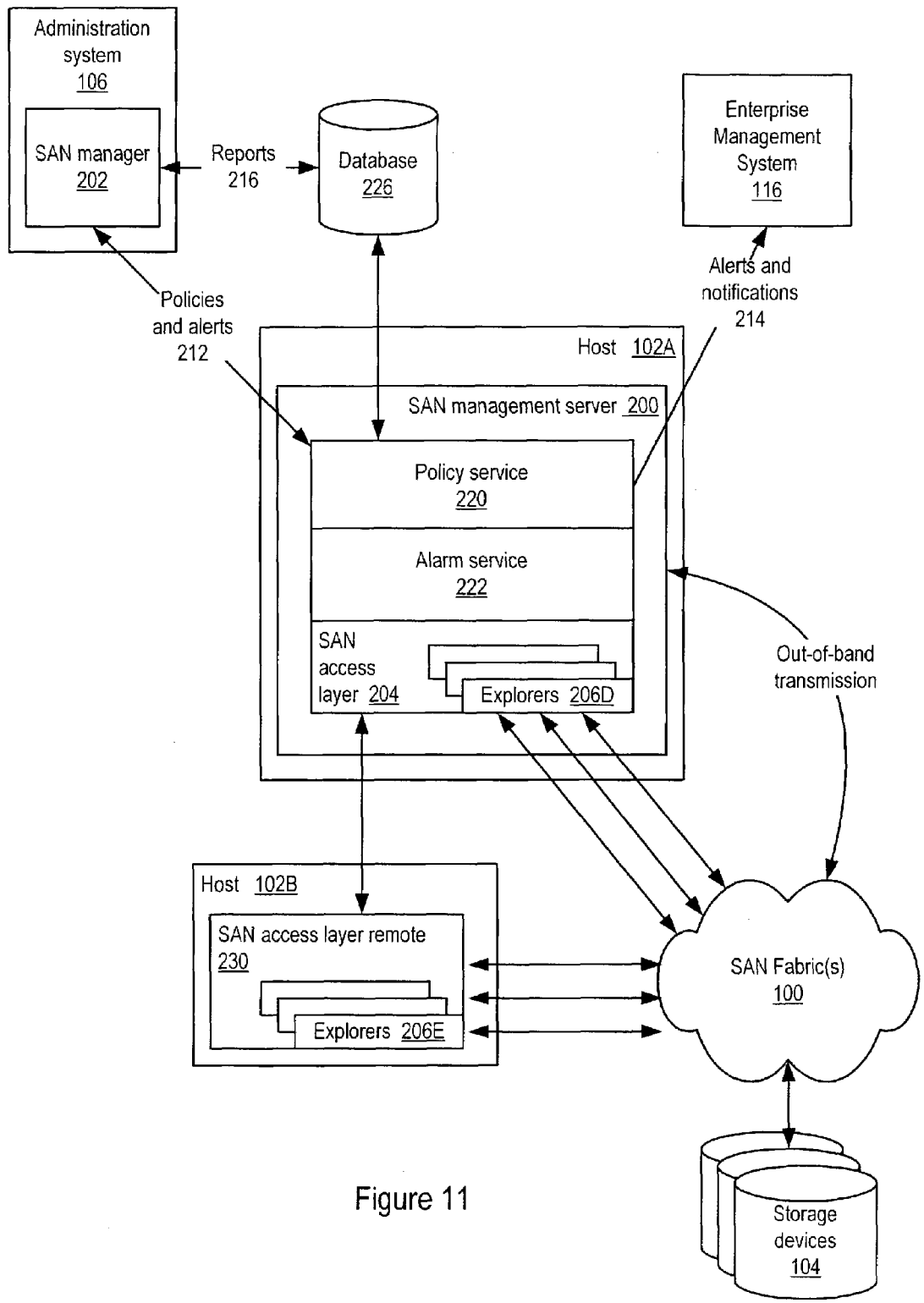
FIG. 11 illustrates an exemplary SAN including a SAN management system and further illustrates the architecture and operation of the SAN management system according to one embodiment.

FIG. 11 illustrates an exemplary SAN and further illustrates the architecture and operation of the SAN management system according to one embodiment. This embodiment may be based on a distributed client-server architecture, and may be divided into components which may include a SAN manager 202, a SAN management server 200, a SAN access layer 204 and a database 226. In this embodiment, SAN access layer 204 may be a component or "layer" of SAN management server 200. SAN management server 200 may also include a policy service 220 and an alarm service 222.

In one embodiment, one or more explorers 206D may be included within SAN access layer 204. In one embodiment, SAN access layer 204 may aggregate information gathered by explorers 206D into a SAN access layer 204 data store. Once the SAN is discovered, SAN access layer 204 may periodically examine the SAN for objects that are added, objects that are removed, and connections that are pulled. In one embodiment, new explorers 206 may be added as needed or desired. For example, if a new type of SAN device is added to the SAN, or an existing type of SAN device is modified or upgraded, an explorer 206 may be added or updated to correctly communicate with the new or updated type of SAN device.

Explorers 206 may use different methods to discover information about heterogeneous SAN objects. In one embodiment, explorers 206 may query objects on the SAN to retrieve a standard set of attributes for each type of object. The terms "information" and "details" may be used to describe the different kinds of data about a SAN that may be discovered, including, but not limited to, SAN events, zone memberships, connectivity, etc. The term "attributes" refers to a subset of that larger body of information. Attributes are details that are particular to a type of object, such as a switch—details such as its vendor, model number, firmware version, port count, World Wide Name (WWN), and out-of-band address.

Explorers 206 may be categorized into types including, but not limited to, switch explorers, zoning explorers, disk array explorers, and Host Bus Adapter (HBA) explorers. Switch explorers may discover switch information such as vendor name, firmware version, and model name. Switch explorers may include, but are not limited to, a management server explorer and an out-of-band switch explorer. A management server explorer may communicate with supported switches over Fibre Channel connections. In one embodiment, the management server explorer may use the Fibre Channel Common Transport (CT) protocol to communicate with switches in fabric 100. The management server explorer may, for example, discover switches in-band over Fibre Channel, obtain switch characteristics, and/or explore port connectivity. In one embodiment, the management server explorer may optionally run over IP networks. For some switches, the management server explorer may run out-of-band. In one embodiment, the management server explorer may perform in-band zoning.

One embodiment may include an out-of-band switch explorer to communicate with switches (or their proxies) over Ethernet. In one embodiment, the out-of-band switch explorer may discover devices managed over any IP network. In one embodiment, the out-of-band switch explorer may use SNMP (Simple Network Management Protocol). SNMP is a protocol for monitoring and managing systems and devices in a network. The data being monitored and managed is defined by a MIB (Management Information Base), the specification and formal description of a set of objects and variables that can be read and possibly written using the SNMP protocol. Some embodiments may use other network protocols, for example Common Management Information Protocol (CMIP), Remote Monitoring (RMON), etc. Enabling the out-of-band switch explorer may include specifying IP addresses for each switch (or for multiple switch fabrics, each proxy) in a SAN access layer configuration file.

Zoning explorers may be used as an interface for SAN access layer 204 to communicate with fabric switches to perform discovery and control of zones in the SAN. When users issue zoning commands, SAN access layer 204 may use a zoning explorer to contact the switch to perform the zoning operation. In one embodiment, zoning explorers may communicate with the switches out-of-band. Embodiments may provide zoning explorers specific to fabric switches provided by various switch vendors. In one embodiment, one or more zoning explorers may complete transactions with a switch management server (name server) to discover zone names and attributes and to perform switch zoning commands.

HBA explorers may discover information about SAN-connected storage devices 104 that are zoned to a host 102 that is running a SAN management server 200 or where a SAN access layer remote 230 (described below) resides. The HBA explorer may interact with a host 102 to discover HBAs and device paths. A device path may be defined as a route through an interconnect that allows two or more devices to communicate. In one embodiment, an HBA explorer may not discover locally attached storage (e.g. disks or other devices attached through a SCSI or IDE controller). If these storage devices have OS handles, then the HBA explorer may return LUN names and attributes. An OS handle may be used by the operating system to identify a storage resource (known as an Addressable Unit, or AU), and the correct methods (e.g. driver/system call) to access the storage resource. If no OS handles are available, then the HBA explorer may identify the device as a generic device (a block device attached to a port on the host).

Disk array explorers may provide information about array names and their attributes, such as number of ports and the number of disks contained in an array. Disk array explorers may discover disk arrays/enclosures and their LUNs. Disk array explorers may pass LUN management commands to the array's management interface (e.g. CCS or SYMCLI) to execute. In one embodiment, disk array explorers may discover LUNs that are not masked to discovered hosts. SAN access layer 204 may include disk array explorers specific to disk arrays of various vendors. In one embodiment, disk array explorers may start when SAN access layer 204 starts. In one embodiment, the disk array explorers may check to see if host 102 has a management interface. If host 102 does not have the management interface, the corresponding explorer may be disabled. If the management interfaces are present, the explorers may determine if the host has access to any LUNs exported by the array. If any LUNs are available, the explorers may attempt to discover the array using the OS handle of the LUN. In one embodiment, some disk array explorers may use an out-of-band network protocol such as SNMP to communicate directly with the disk array controller. IP addresses for each disk array may be supplied for SAN access layer 204 discovery and communication. In one embodiment, SAN access layer 204 may communicate with a disk array through the array's management interface. In one embodiment, the array vendor's management software is installed on a host 102 with an in-band connection to the arrays to be managed. The management software may provide a unified interface/command interpreter between the SAN management system and the arrays on the fabric. In one embodiment, a SAN management server 200 or a SAN access layer remote 230 is installed on the host 102 that is running the management software in order to communicate with the arrays.

In one embodiment, SAN access layer 204 may automatically discover information for each Addressable Unit (LUN) that is under the control of a volume manager. In one embodiment, SAN management server 200 may discover information about HBAs on other hosts 102 attached to fabrics 100 discovered by SAN management server host 102A.

One embodiment may include a SAN access layer remote 230 that may be installed on one or more other hosts 102 in the SAN, if any, to assist SAN management server 200 in discovering the entire SAN. In one embodiment, SAN access layer remote 230 may be installed on every host 102 on the SAN (excepting the host including the SAN access layer 204) to provide complete and accurate discovery. In one embodiment, each installation of SAN access layer remote 230 may include one or more explorers 206E. In one embodiment, explorers 206E may include one or more explorers 206 that may also be used by SAN access layer 204, such as a management server explorer and an HBA explorer. In one embodiment, explorers 206E may also include an out-of-band switch explorer. In one embodiment, SAN access layer 204 and each installation of SAN access layer remote 230 may each include a set of one or more explorers 206 that may be determined by the discovery requirements and/or contents of the region of the SAN visible to the host 102 on which SAN access layer 204 or the installation of SAN access layer remote 230 resides. Each installation of SAN access layer remote 230 may provide information gathered by explorers 206E to SAN access layer 204, which may aggregate this information into SAN access layer 204 data store. In one embodiment, SAN management server 200 communicates with SAN access layer remote(s) 230 across an HTTP connection. In one embodiment, SAN management server 200 may use XML to communicate with SAN access layer remote(s) 230. Other embodiments may use other connections and other communications protocols.

In one embodiment, to get detailed information about a remote host 102, SAN access layer remote 230 may be installed on the host 102, and the host 102 may be added to a SAN access layer configuration file on SAN management server 200. In one embodiment, a host 102 running SAN access layer remote 230 may be specified as either a "Host" or an "In-Band Host" in the SAN access layer configuration file. The "Host" entry may be used to define other hosts 102 attached to the SAN. The "In-Band Host" entry may be used to define at least one SAN access layer remote host 102 per each fabric 100 that is not attached to and thus not discovered by SAN management server 200. In one embodiment, if SAN access layer remote 230 is not installed on a host 102, SAN management server 200 may still discover the HBA, and the enclosure utility may be used to accurately visualize the host in SAN manager 202's user interface.

In one embodiment, policy-based management may enable the monitoring of conditions on a SAN and may facilitate quick response when problems occur. Conditions that may be monitored may fall into one or more categories of interest to storage administrators. Embodiments may use one or more methods for monitoring conditions on a SAN. These methods may include, but are not limited to, out-of-band polling (e.g. SNMP polling), traps (e.g. SNMP traps) and SAN access layer 204. SAN access layer 204 may provide notification of SAN events such as the addition or deletion of SAN components such as SAN fabrics, switches and arrays. One embodiment may monitor conditions in-band, e.g. using the Fibre Channel Common Transport (CT) protocol.

Among other SAN monitoring methods, SAN management server 200 may receive SNMP traps from elements on the SAN. To monitor conditions on a SAN using SNMP traps, some SAN objects may send SNMP traps to SAN management server 200 when an event happens. SNMP-capable devices on the SAN may be configured to send traps to the host 102A running SAN management server 200. In one embodiment, these traps are asynchronous, so the SAN management system cannot poll such an object to determine the current condition. This embodiment may be dependent on the trap sender to report when a condition changes by sending additional traps. In another embodiment, objects may be polled directly to determine the current condition. In one embodiment, to monitor an object on a SAN, the object may include an SNMP agent that is configured to accept SNMP polls and to send SNMP traps.

One embodiment may include collectors. A collector may be a path or channel through which a specific type of data is gathered for a specific object type. Collectors may include one or more of, but are not limited to, collectors for object availability, environmental conditions, device errors, and SAN traffic. Collectors may monitor properties such as switch port status, dropped frames, disk temperature, link failures and so on, which may be evaluated by policy service 220 to create an accurate composite status of the SAN. In one embodiment, the status of devices may be displayed on a topology map of a SAN manager 202 user interface, for example using color-coded icons. In one embodiment, these collectors may be based on devices' SNMP MIB variables. One embodiment may include one collector per data type per object, for each object that can be monitored. In one embodiment, each collector may be associated with an object type, such as a SAN host 102 or a switch port. In one embodiment, each collector may be associated with a type of data, for example textual state or numeric threshold data. Collector data may be used in real-time collector graphs, the policy engine, and the SAN reporter, for example.

One embodiment may include a policy service 220 that manages policies associated with objects on the SAN. Policies may be rules used to help manage a SAN by automating responses to certain events and conditions. Policies may detect when something goes wrong, and may be used to anticipate and handle problems before they occur. A policy may indicate a particular object or type of object to monitor. In general, any object for which at least one collector is provided may be monitored. Objects that may be monitored include, but are not limited to, fabrics 100, switches, switch ports, hosts 102, and disk arrays. One embodiment may include a set of policies that monitor SAN management server 200. A policy may include a description of a condition to monitor on an object, such as a high percentage of bandwidth utilization on a switch port, and a set of actions to take when that condition is met. A policy may indicate one or more actions to be taken when the condition is detected. In one embodiment, policy service 220 may be integrated with SAN manager 202, permitting users to view what policies are in effect on their SAN, to define and modify policies, and to generate inventory and performance reports based on the conditions monitored by policy service 220. In one embodiment, SAN manager 202 may include a policy utility to facilitate policy creation and maintenance. The policy utility may lead a user through the steps of providing the information described above to create user-defined policies. The user may use the policy utility to make changes in predefined or user-defined policies as desired.

One embodiment may include a policy engine that performs the instructions described in all policies enabled on the SAN. In one embodiment, the policy engine may be a component or process of policy service 220. When the objects on the SAN are discovered, collectors corresponding to the objects may be determined and the relevant collectors may be registered with the policy engine. The policy engine then may receive a stream or streams of real-time collector data and compare data values with the conditions described in its policies. When the alarm condition for a particular policy is met, the policy engine performs the actions described in the policy.

An alarm is a signal that is generated by a policy when the condition specified in the policy is detected or evaluated as true. An alarm may be triggered if the condition and alarm action are configured in the policy. An alarm is an internal signal used by the SAN management system. An alert to SAN manager 202 is a configurable response that may result from an alarm being triggered. When an alarm is triggered, the alarm may be referred to as active. In one embodiment, alarms may be dynamic—the alarm resets itself automatically when the condition monitored by the policy returns to a specified "clear state." The clear state for a condition may specified either manually or automatically, depending on whether the condition is a threshold or a textual comparison condition. One embodiment may include an alarm service 222 that may monitor and collect status and performance information from the SAN using both out-of-band (e.g., SNMP) and SAN access layer 204 events. This collector information may be fed into policy service 220 to trigger policy actions and for logging for reporting purposes. In one embodiment, data collected by the alarm service may be logged in database 226.

The conditions available for a policy may be determined by the type of object being monitored. Different types of policy conditions may result in different types of alarms. There may be different types of conditions for various objects managed by SAN management server 200. One type of policy is a threshold condition with action policy which may be used to monitor an object and detect when a particular numeric threshold is reached and sustained for a configurable period. Another type of policy is a text comparison condition with action policy that may be used to evaluate a textual state to determine the status or condition of the resource.

For every policy, one or more actions to be taken when the specified condition is detected may be configured. Actions may, for example, perform corrective and/or notification functions. One type of policy action is a console alert, which may send an alert to SAN manager 202 when the specified condition is detected. The desired level of severity associated with the action may be configurable. Another type of policy action is a command or script (e.g., a PERL script) that executes a command or executable file specified for the action. Yet another type of policy action is to send e-mail notification to one or more specified recipients. In one embodiment, policy service 220 may be configured to send traps (e.g. SNMP traps) as notifications to applications. In one embodiment, policy action options may also include paging and Instant Messaging.

In one embodiment specific hardware alerts may be forwarded to alert on the applications that will be affected by the hardware problems. In one embodiment application alerts and/or hardware alerts may be forwarded to create alerts for specific departments. This may preferably provide a top-down alert hierarchy.

In one embodiment, SAN manager 202 may serve as a centralized point from which a SAN administrator or other user may create and manage groups of SAN objects, including groups of heterogeneous components. One embodiment may provide a group utility for creating and managing logical groups of SAN objects including hosts 102, storage device 104 interconnects, other groups, and other objects that may be members of a group. A group may be defined as an arbitrary set of SAN elements defined by an administrator to help organize and provision resources, and may be implemented by storage administrators to identify and manually provision available storage devices 104 that match the quality of service requirements of particular user groups or applications. The group utility may be used to create logical storage groups where device membership may be based on zoning, LUN masking, hosts etc., and may also be based on the need for a collection of devices to be viewed as one entity for activities such as reporting, configuring and monitoring SAN resources.

One embodiment may support one or more types of groups, including, but not limited to, generic groups, storage accounts, and storage groups. In one embodiment, groups may be nested within other groups. Generic groups may include switches, hosts 102, storage devices 104, and/or nested groups of any group type. Storage accounts may include hosts 102, storage devices 104, and/or nested groups (storage accounts or storage groups only). A storage account may include one or more host objects and all the storage that the administrator assigns to them. Storage groups may include storage devices 104 and/or nested groups (storage groups only). Storage groups may be used to categorize storage resources by quality of service criteria including, but not limited to, cost, performance, capacity and location.

A zone is a set of objects within a SAN fabric that can access one another. By creating and managing zones, the user may control host 102 access to storage resources. One embodiment may provide methods to enforce the access restrictions created by zones on the SAN. These may include methods that correspond to the forms of zoning commonly referred to as soft zoning and hard zoning. Soft zoning, also called advisory zoning, may be enforced simply by filtering the visibility of objects on the SAN so that an object can only see other objects that share at least one zone membership with the object. In hard zoning, a Fibre Channel switch may actively block access to zone members from any objects outside the zone. This may be performed at the level of ports on the switch. Hard zoning may also be referred to as switch port zoning.

One embodiment may support the zoning of objects on the SAN including, but not limited to, switch ports, hosts 102, and storage devices 104. One embodiment may support switch zoning though application program interfaces (APIs) provided by switch vendors, allowing for both hard and soft zoning. In one embodiment, SAN manager 202 may serve as a centralized point from which a user may access SAN management system and/or third-party services, tools, applications, and/or utilities to create and manage zones on the SAN, including zones containing heterogeneous SAN objects. There may be no industry-wide standard for zoning, and different vendors' switches may implement switch zoning in different ways. Thus, one embodiment may use a switch-neutral approach to zoning. One embodiment may provide a zone utility that may facilitate the creation, modification, and deletion of zones. The zone utility may provide storage zone definition, creation and management. The zone utility may be used to administer zones directly and visually; and may reduce or remove the need to use telnet commands or proprietary, hardware-specific Web-based solutions. The zone utility may automatically filter the list of objects on the SAN and present a list of objects that are available to be added to a zone.

One embodiment may integrate storage masking from various array providers to hosts 102 in the SAN. LUN (Logical Unit Number) security is the collective name given to the operations involved in making storage device 104 resources available to hosts 102 on a SAN, and may include LUN locating or searching, LUN binding, LUN masking, and fabric zoning. In one embodiment, LUN security may provide granular control over host 102 access to individual LUNs within an array or other collection of potentially heterogeneous storage devices.

One embodiment may provide a LUN security utility that may provide a central point from which to perform LUN security operations including LUN binding (the creation of access paths (LUNs) between Addressable Units within a disk array and ports on the array), LUN masking (enabling access to Addressable Units for host HBA ports) and fabric zoning (allowing the host to see the AU and create an Operating System (OS) handle for it). In one embodiment, the LUN security utility may be provided through the SAN manager. In one embodiment, the LUN security utility may guide the user through configuring LUN security operations and allow the user to execute the configured LUN security operations with a single operation, for example, a single click of a button in the user interface. LUN security operations configured and initiated using the LUN security utility may be viewed as transactions. A transaction may be defined as a sequence of information exchange and related work that is treated as a unit for the purposes of satisfying a request and for ensuring data integrity. For a transaction to be completed and changes to be made permanent, a transaction has to be completed in its entirety.

One embodiment may provide a LUN query tool that may be used to search for and find LUNs on the SAN that match one or more properties, such as device vendor, storage type, capacity, configuration, cost, and location. The LUN query tool may return a list of all LUNs that meet those requirements. In one embodiment, the LUN query tool may be launched in context from another utility such as a zone utility or a LUN security 30 utility. One embodiment may provide a mechanism for users to manually create objects such as storage enclosures, hosts and generic devices in the SAN access layer data store from SAN manager 202 to represent undiscoverable SAN elements. One embodiment may provide a mechanism for a user to manually enter customized attributes for heterogeneous SAN objects.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A storage area network (SAN), comprising:
   one or more host systems running a plurality of applications;
   a plurality of storage devices;
   a SAN fabric comprising a plurality of fabric components for coupling the one or more host systems to the storage devices;
   a system configured to implement a task group monitor for a plurality of tasks, wherein each task is scheduled by a corresponding one of the plurality of applications to execute on the SAN, and wherein the task group monitor is configured to:
      form a separate task group for each one of the plurality of tasks, such that each separate task group comprises a plurality of components selected from at least two of a host system, a storage device, and a SAN fabric component, wherein each component in the separate task group is designated to participate in performing the task for which the separate task group was formed;
      store information for each separate task group to identify the respective components and the respective task for each separate task group;
      monitor all of the components in all the separate task groups, wherein for each separate group, the components of the separate task group are monitored for a period of time in advance of the scheduled execution of the respective task in order to detect conditions affecting the scheduled execution of the respective task in advance of the scheduled execution of the respective task; and
      in response to detecting a condition pertaining to one of the monitored component:
         based on the stored information for the separate task groups, identify one or more of the tasks whose scheduled executions are affected by the detected condition in advance of the scheduled executions of the one or more tasks affected by the detected condition; and
         generate one or more alerts identifying the one or more tasks whose scheduled executions are affected by the detected condition in advance of the scheduled executions of the one or more tasks.

2. The SAN as recited in claim 1, wherein said alert indicates one or more of the SAN components of the task group for which the condition affecting scheduled execution of the task is detected.

3. The SAN as recited in claim 1, wherein the task group monitor is further configured to provide a notification of the alert to a human operator of the corresponding application for resolution of the condition in advance of the scheduled execution of the task.

4. The SAN as recited in claim 1, wherein the task group monitor is further configured to disband the task group after the scheduled execution of the task.

5. The SAN as recited in claim 1, wherein at least one of the one or more host systems is configured to implement a SAN management system configured to discover the SAN components and collect information from the SAN components, and wherein, to monitor the SAN components in the task group, the task group monitor is further configured to access the information collected from the SAN components by the SAN management system.

6. A system, comprising:
   a processor; and
   a memory comprising program instructions, wherein the program instructions are executable by the processor to:
      form a separate task group for each one of a plurality of tasks, such that each separate task group comprises a plurality of components selected from at least two of a host system, a storage device, and a storage area network (SAN) fabric component coupling one or more host systems to one or more storage devices, wherein:
         each component in the separate task group is designated participate in performing the task for which the separate task group was formed, and wherein each one of the plurality of tasks is scheduled to execute on the SAN by one of several applications running on one or more host systems of the SAN;
      store information for each separate task group to identify the respective components and the respective task for each separate task group;
      monitor all of the components in all the separate task groups, wherein for each separate task group, the components of the separate task group are monitored for a period of time in advance of a scheduled execution time of the respective task in order to detect conditions affecting the scheduled execution of the respective task in advance of the scheduled execution time of the respective task; and
      in response to detecting a condition pertaining to one of the monitored components:
         based on the stored information for the separate task groups, identify one or more of the tasks whose scheduled executions are affected by the detected condition in advance of the scheduled execution times of the one or more tasks affected by the detected condition; and
         generate one or more alerts identifying the one or more tasks whose scheduled executions are affected by the detected condition in advance of the scheduled execution times of the one or more tasks.

7. The system as recited in claim 6, wherein said alert indicates one or more of the SAN components of the task group for which the condition affecting scheduled execution of the task is detected.

8. The system as recited in claim 6, wherein the program instructions are further executable by the processor to provide a notification of the alert to a human operator of the corresponding application for resolution of the condition in advance of the scheduled execution of the task.

9. The system as recited in claim 6, wherein the program instructions are further executable by the processor to implement a SAN management system configured to discover the SAN components and collect information from the SAN components, and wherein, to monitor the SAN components in the task group, the program instructions are further executable by the processor to access the information collected from the SAN components by the SAN management system.

10. A system, comprising:
   a processor; and
   a memory comprising program instructions, wherein the program instructions are executable by the processor to:
      monitor a plurality of Storage Area Network (SAN) components selected from at least two of a host system, a storage device, and a storage area network (SAN) fabric component coupling one or more host systems to one or more storage devices, wherein:
         there is a specific task scheduled to execute on the SAN by one of several applications running on one or more host systems of the SAN such that each one of the plurality of SAN components is designated to participate in performing the specific task;
         said monitoring is performed for all the designated components for the specific task for a period of time in advance of a scheduled execution time of the specific task in order to detect conditions affecting the scheduled execution of the specific task in advance of the scheduled execution time of the specific task; and
      store information for the specific task to identify the specific task and the components designated to participate in performing the specific task;
      wherein said monitoring and said storing are performed for a plurality of separate specific tasks;
      in response to detecting a condition pertaining to one of the monitored component:
         based on the stored information for each specific task, identify each specific task whose scheduled execution is affected by the detected condition in advance of the scheduled execution time of the task affected by the detected condition; and
         generate one or more alerts identifying the specific tasks whose scheduled executions are affected by the detected condition in advance of the scheduled execution time of the affected specific task.

11. A system, comprising:
   means for grouping one or more Storage Area Network (SAN) components selected from at least two of a host system, a storage device, and a storage area network (SAN) fabric component coupling one or more host systems to one or more storage devices, wherein:
      there is a specific task scheduled to execute on the SAN by one of several applications running on one or more host systems of the SAN such that each one of the grouped SAN components is designated to participate in performing the specific task;
   means for monitoring all the grouped SAN components for the specific task for a period of time in advance of a scheduled execution time of the specific task in order to detect conditions affecting scheduled execution of the specific task in advance of the scheduled execution time of the specific task; and
   means for storing information for the group to identify the specific task and the components designated to participate in performing the specific task;
   wherein said grouping and said storing are performed for a plurality of separate specific tasks;
   means for identifying, based on the stored information for the separate task groups and in response to detecting a condition pertaining to one of the monitored components, one or more of the specific tasks whose scheduled executions are affected by the detected condition in advance of the scheduled execution times of the one or more tasks affected by the detected condition;
   means for generating one or more alerts identifying the specific tasks whose scheduled executions are affected by the detected condition in advance of the scheduled execution time of the affected specific task in response to detecting the condition affecting scheduled execution of the specific tasks.

12. The system as recited in claim 11, further comprising means for providing a notification of the alert to a human operator of the application for resolution of the condition in advance of the scheduled execution of the task.

13. A network system, comprising:
   a network comprising a plurality of network components;
   a computer system coupled to the network and configured to:
      form a group comprising one or more of the network components designated to in participate in performing a data transfer task scheduled to execute on the network, wherein the one or more network components form a network path for the scheduled data transfer task, and wherein the group comprises at least two of a host system, a storage device, and a SAN fabric component;
      store information for the group to identify the designated network components and the data transfer task;
      monitor all the one or more network components in the group for the scheduled data transfer task for a period of time in advance of a scheduled execution time of the data transfer task in order to detect conditions affecting the scheduled execution of the data transfer task in advance of the scheduled execution time of the data transfer task; and
      wherein said monitoring and said storing are performed for a plurality of separate specific data transfer tasks;
      in response to detecting a condition pertaining to one of the monitored network components:
         based on the stored information for each group, identify each specific data transfer task whose scheduled execution is affected by the detected condition in advance of the scheduled execution time of the data transfer task affected by the detected condition; and
         generate one or more alerts for the data transfer tasks identifying the specific data transfer tasks whose scheduled executions are affected by the detected condition in advance of the scheduled execution time of the affected data transfer tasks.

14. The network system as recited in claim 13, wherein the system is further configured to provide a notification of the alert to a human operator for resolution of the condition affecting the scheduled execution of the data transfer task in advance of the scheduled execution of the task.

15. The network system as recited in claim 13, wherein, to form a group comprising one or more of the network components involved in performing a data transfer task scheduled to execute on the network, the system is further configured to:
   access a schedule for the data transfer task; and
   determine from the schedule the one or more network components forming the network path to be used in the scheduled execution of the data transfer task.

16. A method, comprising:
- a Storage Area Network (SAN) application on a host system of a SAN scheduling a task for execution on the SAN;
- generating a task group comprising one or more SAN components of the SAN designated to participate in performing the scheduled task, wherein the task group comprises at least two of a host system, a storage device, and a SAN fabric component;
- storing information for the task group to identify the designated components and the scheduled task;
- monitoring all the SAN components in the task group in advance of a scheduled execution time of the task in order to detect conditions affecting the scheduled execution of the task in advance of the scheduled execution time of the task; and
- in response to detecting a condition pertaining to one of the monitored components:
  - based on the stored information for the task group, identify the task whose scheduled execution is affected by the detected condition in advance of the scheduled execution time of the task affected by the detected condition; and
  - generating an alert identifying the task whose scheduled execution is affected by the detected condition in advance of the scheduled execution time of the task.

17. The method as recited in claim 16, wherein said alert indicates one or more of the SAN components of the task group for which the condition affecting scheduled execution of the task is detected.

18. The method as recited in claim 16, further comprising providing a notification of the alert to a human operator of the SAN application for resolution of the condition in advance of the scheduled execution of the task.

19. The method as recited in claim 16, wherein one or more host systems of the SAN implement a SAN management system, the method further comprising:
- the SAN management system discovering the SAN components and collecting information from the SAN components; and
- wherein said monitoring the SAN components in the task group comprises accessing the information collected from the SAN components by the SAN management system.

20. A computer-accessible storage medium comprising program instructions, wherein the program instructions are computer-executable to implement:
- generating a task group comprising Storage Area Network (SAN) components of a SAN designated to participate in performing a task, wherein:
  - an application on a host system scheduled the task for execution on the SAN, and
  - the task group contains at least two of a host system, a storage device, and a storage area network (SAN) fabric component coupling one or more host systems to one or more storage devices;
- storing information for the task group to identify the designated components and the task;
- monitoring all the SAN components in the task group in advance of a scheduled execution time of the task in order to detect conditions affecting the scheduled execution of the task in advance of the scheduled execution time of the task; and
- in response to detecting a condition pertaining to one of the monitored components:
  - based on the stored information for the task group, identify the task whose scheduled execution is affected by the detected condition in advance of the scheduled execution time of the task affected by the detected condition; and
  - generating an alert identifying the task whose scheduled execution is affected by the detected condition in advance of the scheduled execution time of the task.

21. The computer-accessible storage medium as recited in claim 20, wherein said alert indicates one or more of the SAN components of the task group for which the condition affecting scheduled execution of the task is detected.

22. The computer-accessible storage medium as recited in claim 20, wherein the program instructions are further computer-executable to implement providing a notification of the alert to a human operator of the application for resolution of the condition in advance of the scheduled execution of the task.

23. The computer-accessible storage medium as recited in claim 20, wherein one or more host systems of the SAN implement a SAN management system configured to discover the SAN components and collect information from the SAN components, wherein, in said monitoring the SAN components in the task group, the program instructions are further computer-executable to implement accessing the information collected from the SAN components by the SAN management system.

* * * * *